United States Patent [19]
Castle et al.

[11] Patent Number: 5,813,034
[45] Date of Patent: Sep. 22, 1998

[54] METHOD AND CIRCUITRY FOR MODIFYING DATA WORDS IN A MULTI-LEVEL DISTRIBUTED DATA PROCESSING SYSTEM

[75] Inventors: David Edgar Castle, Poway; Greggory Douglas Donley, Sunnyvale; Laurence Paul Flora, Valley Center, all of Calif.

[73] Assignee: Unisys Corporation, Blue Bell, Pa.

[21] Appl. No.: 591,844

[22] Filed: Jan. 25, 1996

[51] Int. Cl.[6] .............................. G06F 13/00; G06F 12/00
[52] U.S. Cl. ........................ 711/146; 711/145; 711/144; 711/141; 711/122
[58] Field of Search .......................... 395/449, 468–473, 395/200.08; 711/122, 141, 142, 143, 144, 145, 146, 131

[56] References Cited

U.S. PATENT DOCUMENTS

| | | | |
|---|---|---|---|
| 4,755,930 | 7/1988 | Wilson, Jr. et al. | 711/122 |
| 5,241,641 | 8/1993 | Iwasa et al. | 711/122 |
| 5,394,555 | 2/1995 | Hunter et al. | 395/800 |
| 5,551,005 | 8/1996 | Sarangdhar et al. | 711/145 |
| 5,581,729 | 12/1996 | Nishtala et al. | 711/143 |
| 5,623,628 | 4/1997 | Brayton et al. | 711/141 |

*Primary Examiner*—Tod R. Swann
*Assistant Examiner*—Hong C. Kim
*Attorney, Agent, or Firm*—Charles J. Fassbender; Mark T. Starr; Steven R. Petersen

[57] ABSTRACT

A multi-level distributed data processing system includes: 1) a system bus having a main memory coupled thereto; 2) multiple high level cache memories, each of which has a first port coupled to the system bus and a second port coupled to a respective processor bus; and, 3) each processor bus is coupled to multiple digital computers through respective low level cache memories. Further, each low level cache memory stores data words with respective tag bits which identify each data word as being shared, modified or invalid but never exclusive; and, each high level cache memory stores data words with respective tag bits which identify each data word as being shared, modified, invalid, or exclusive. By identifying a data word in a low level cache memory as shared, even when that data word is not in any other low level cache memory, the high level cache memories are able to prevent two computers on separate processor busses from modifying that data word differently; and in addition, the high level cache memories are able to track the data words which get modified.

8 Claims, 19 Drawing Sheets

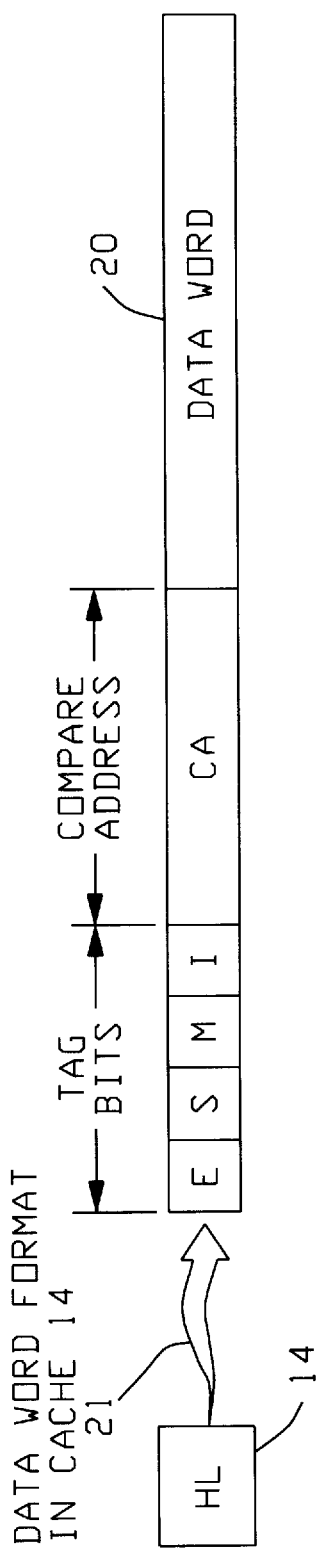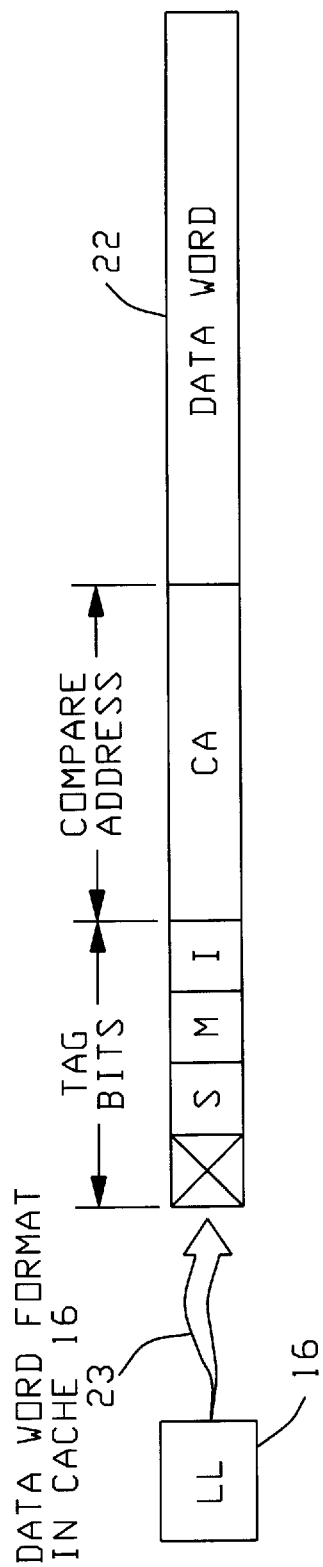

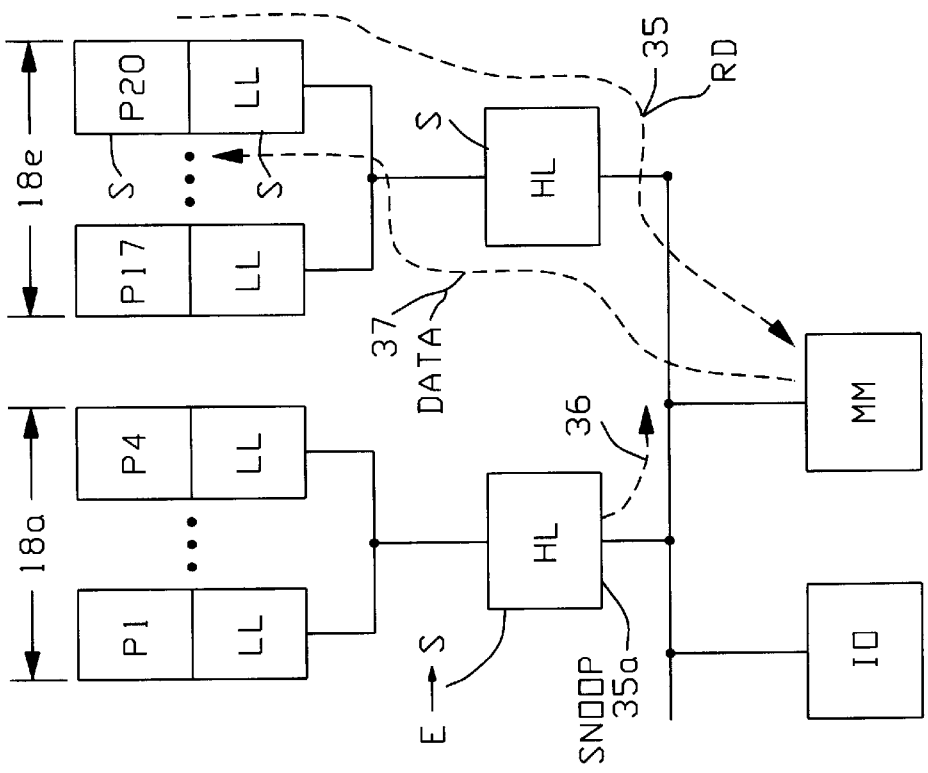
FIG. 4 (P20 READ)
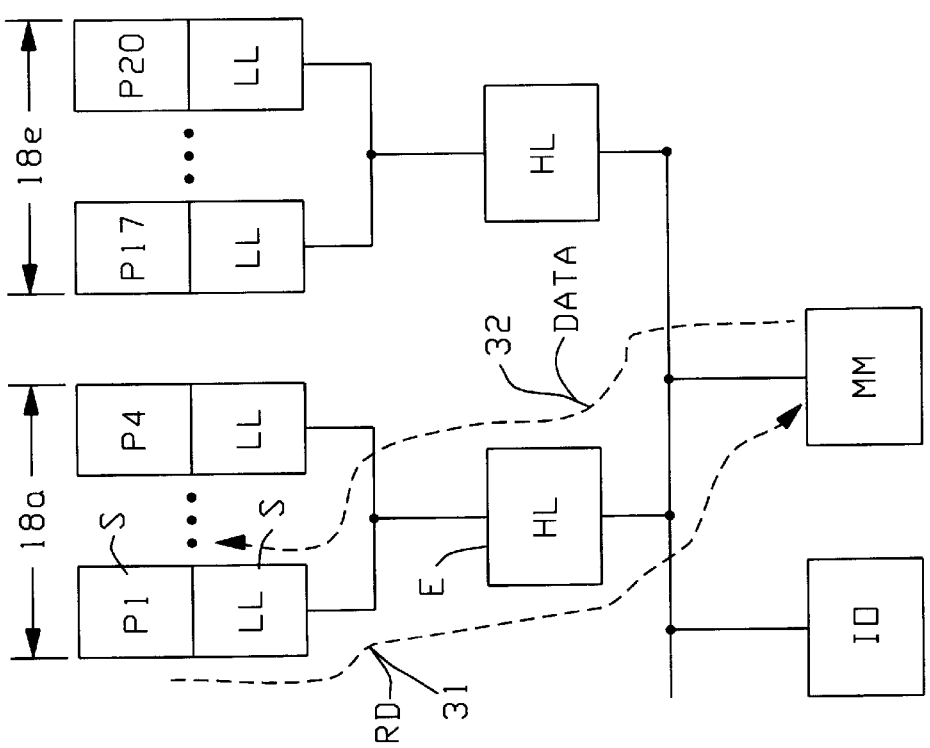
FIG. 3 (P1 READ)

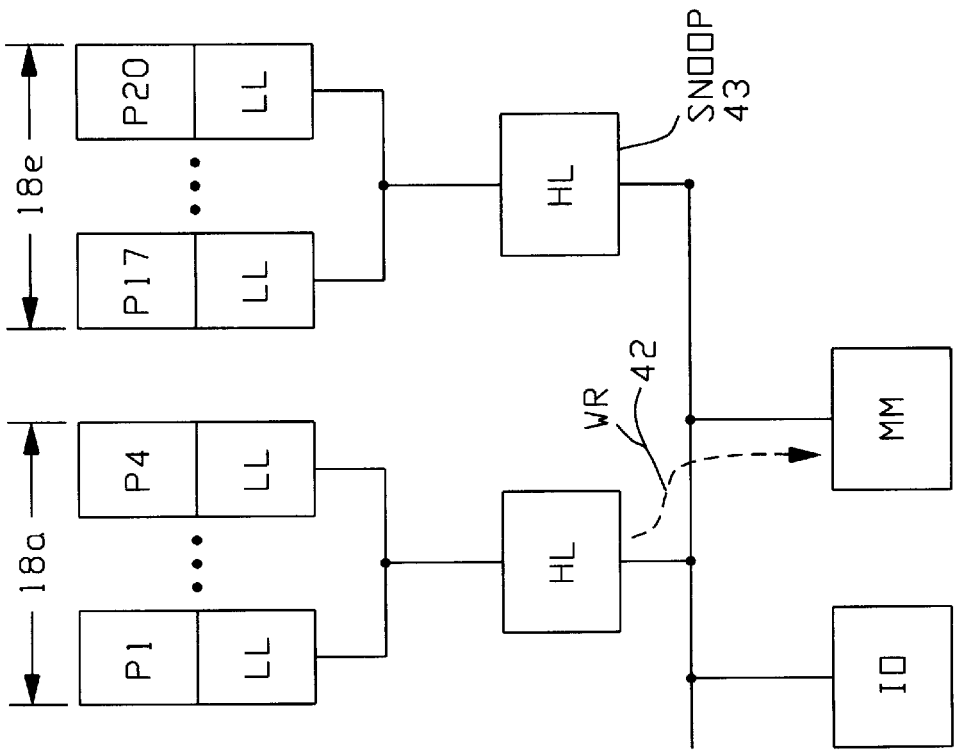
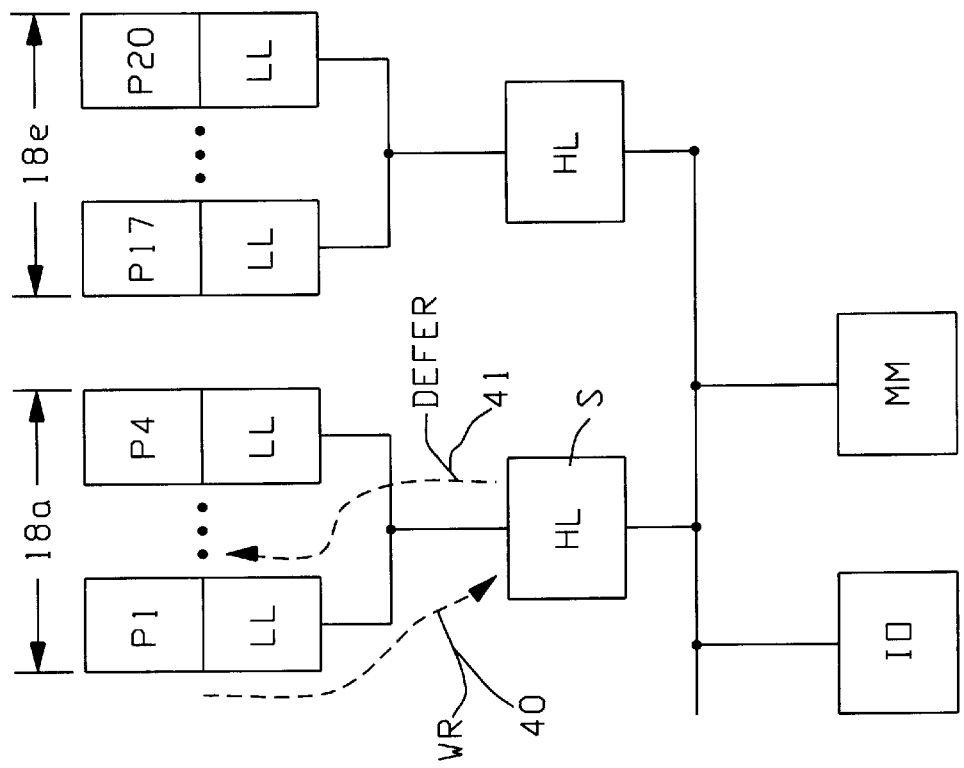

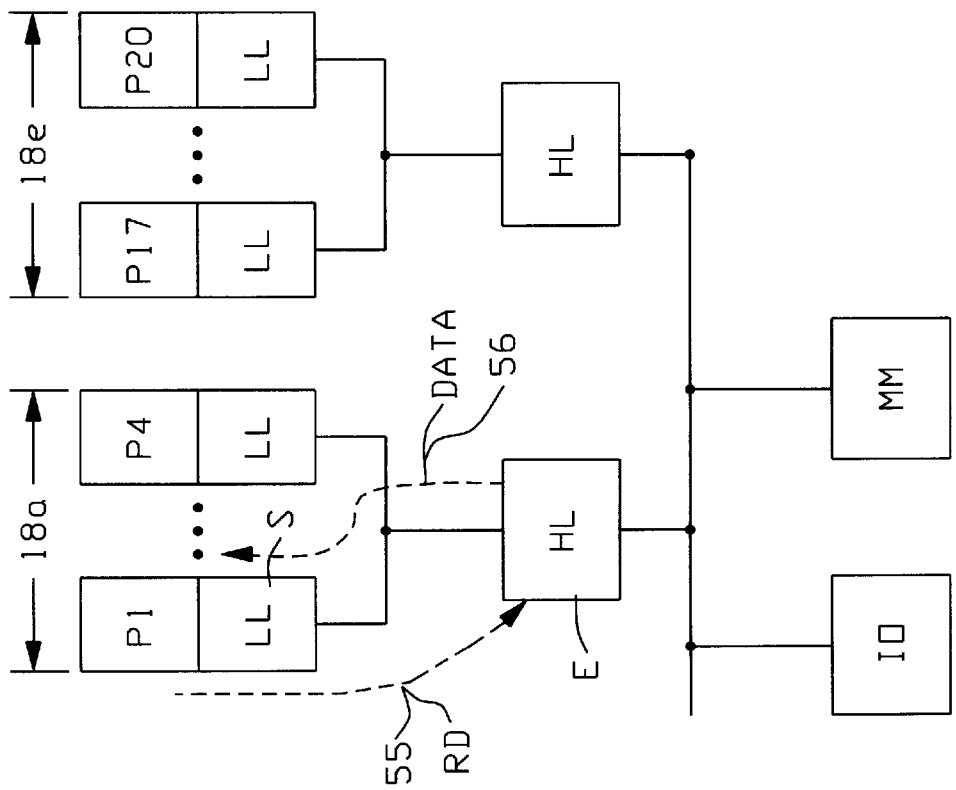
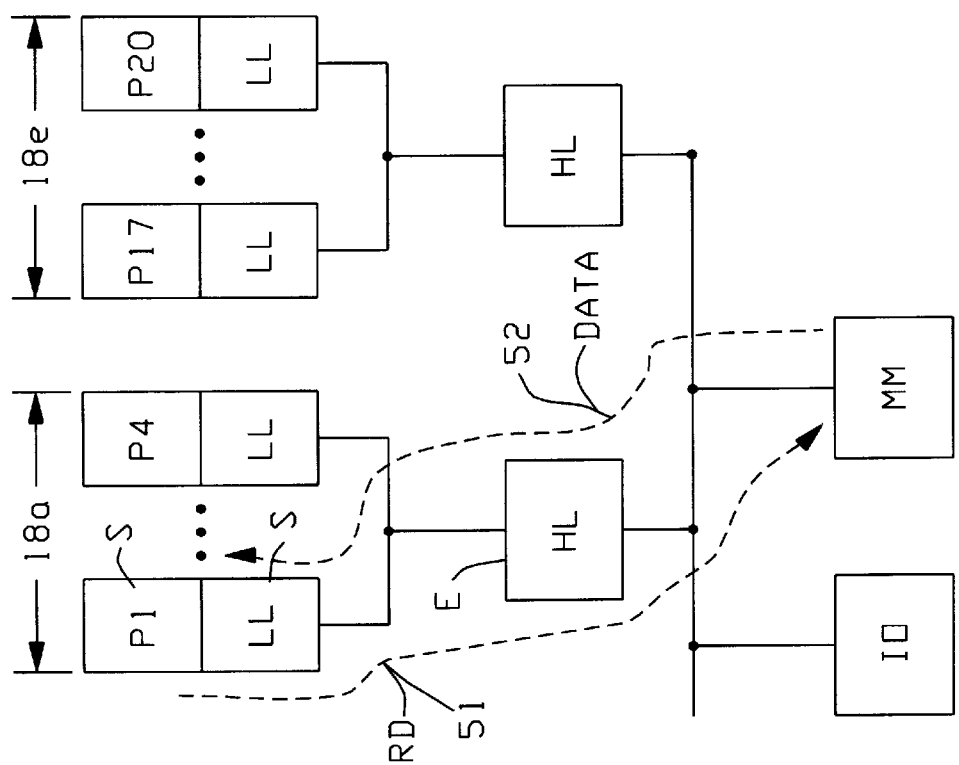

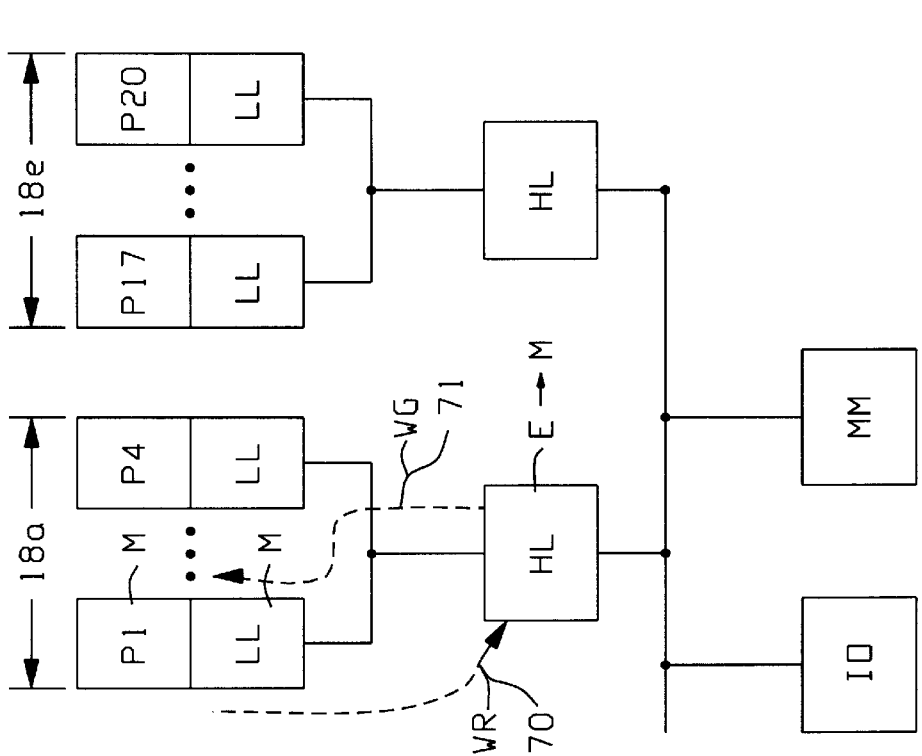
FIG. 8B (NO P20 WRITE)
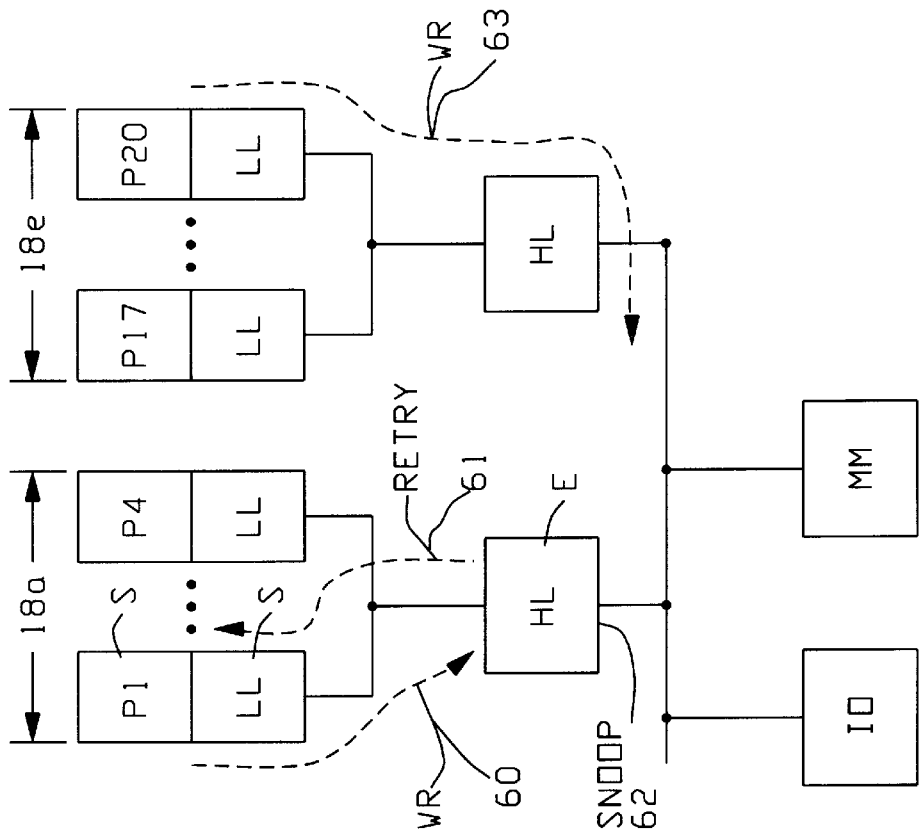
FIG. 8A (P1 WRITE)

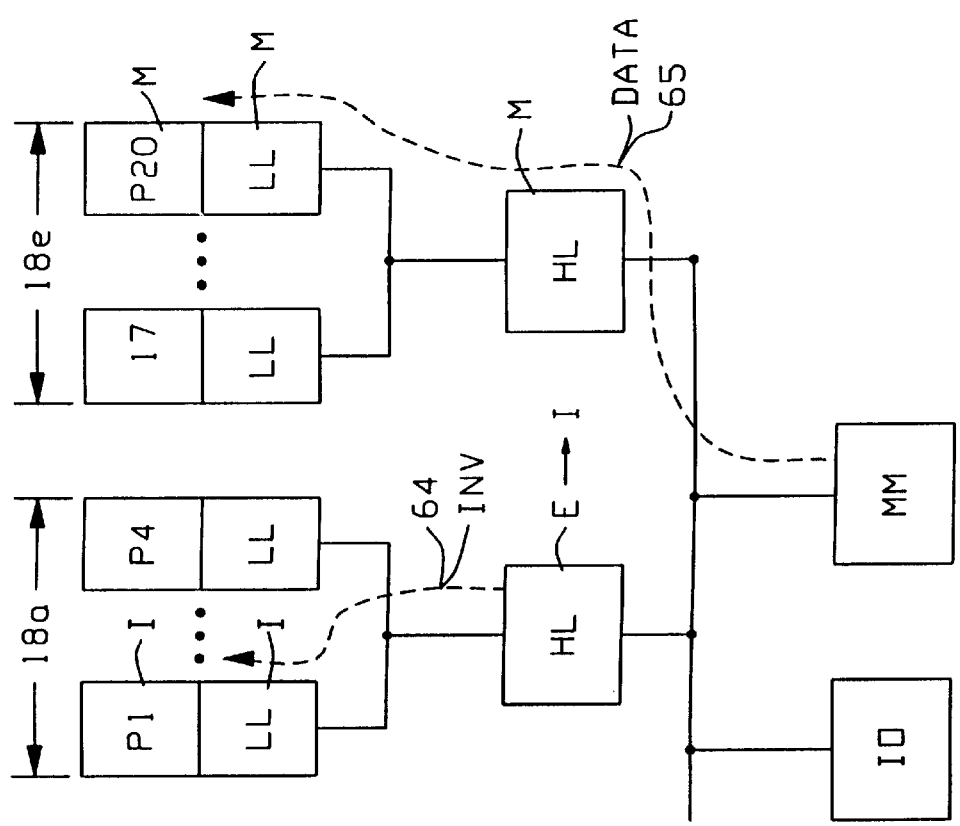
FIG. 8D
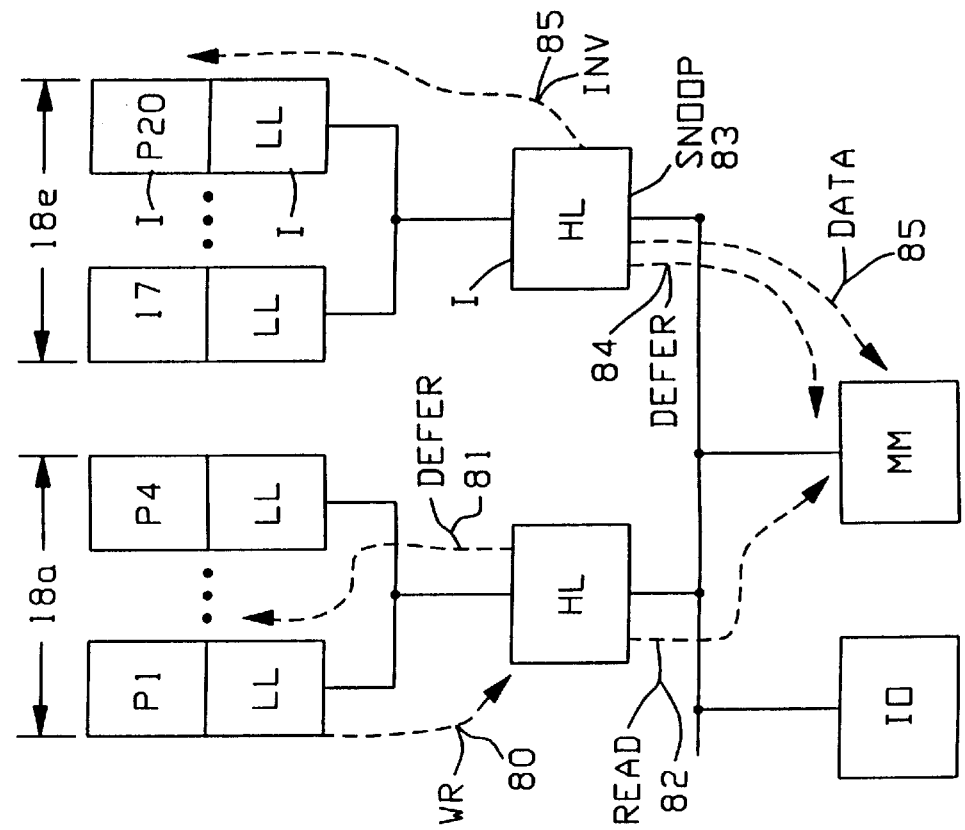
FIG. 8C (P20 WRITE)

METHOD AND CIRCUITRY FOR MODIFYING DATA WORDS IN A MULTI-LEVEL DISTRIBUTED DATA PROCESSING SYSTEM

BACKGROUND OF THE INVENTION

This inventing relates to the structure and operation of the cache memories in a distributed data processing system.

In the prior art, a typical distributed data processing system consists of a single bus, a main memory module coupled to the bus, and multiple digital computers which are coupled to the bus through respective cache memories. One such system, for example, is the Pentium Pro system that was recently announced by Intel in which from one to four digital computers are coupled to a host bus through respective cache memories. See page 1 of Electronic Engineering Times, for Oct. 30, 1995.

Each cache memory in the above distributed data processing system operates faster than the main memory; and thus, the effect of the cache memories is that they provide a performance increase. But, each cache memory has a smaller storage capacity than the main memory; and thus, at any one time instant, each cache memory stores only a subset of all of the data words which are stored in the main memory.

In order to keep track of which data words are in a particular cache memory, each data word is stored in the cache memory with an accompanying compare address and tag bits. This compare address identifies the address of the corresponding data word in the main memory; and the tag bits identify the state of the stored data word. In the above Pentium Pro system, there are four tag bits, E, S, M, and I.

Tag bit E is true when the corresponding data word is stored in just a single cache memory. Tag bit S is true when the corresponding data word is stored in more than one cache memory. Tag M is true when a corresponding data word has been modified by the respective computer to which the cache memory is coupled. And, tag bit I is true when the data word cannot be used.

Now, an inherent limitation which the above Pentium Pro data processing system has is that only a limited number of digital computers with their respective cache memories can be connected to the host bus. This limitation occurs because the physical length of the bus must be restricted in order to transfer signals on the bus at some predetermined speed. If the bus length is increased to accommodate more connections by additional digital computers and their respective cache memories, then the speed at which the bus operates must be decreased.

By comparison, in accordance with the present invention, a multi-level distributed data processing system is disclosed which has the following architecture: a single system bus with a main memory couple thereto; multiple high level cache memories, each of which has a first port coupled to the system bus and a second port coupled to a respective processor bus; and, each processor bus being coupled through respective low level cache memories to respective digital computers. With this multi-level distributed data processing system, each processor bus can be restricted in length and thus operate at a high speed; and at the same time, the maximum number of digital computers on each processor bus can equal maximum number of computers in the entire Pentium Pro system.

However, a problem can arise in the above multi-level distributed data processing system when two digital computers, which are on different processor busses, attempt to execute WRITE commands that modify the same data word. When such an event occurs, the two digital computers cannot be permitted to modify the same data word in their respective low level cache memory differently; otherwise, two different versions of the same data word would exist. But, since the two digital computers which are attempting to modify the data word are on different processor busses, those computers are usable to snoop on each others WRITE commands in order to avoid the problem.

Also, in the multi-level distributed data processing system, each high level cache memory needs to somehow keep track of which data words are modified in the low level cache memories to which it is coupled. Otherwise, each time a READ command occurs on the system bus for a data word which is stored in both the main memory and a particular high level cache memory, that high level cache memory must presume that the data word has been modified by a digital computer on its respective processor bus. This in turn requires the high level cache memory to respond to the READ command by retrieving the presumably modified data word and transferring it to the system bus. However, such action by the high level cache memory will be very time consuming as compared to simply reading the data word from the main memory if it has not actually been modified.

Accordingly, a primary object of the invention is to provide a multi-level distributed data processing system in which the above problems are overcome.

BRIEF SUMMARY OF THE INVENTION

In accordance with the present invention, a distributed data processing system is comprised of: a system bus having a main memory coupled thereto; multiple high level cache memories, each of which has a first port coupled to the system bus and a second port coupled to a respective processor bus; and, each processor bus is coupled to multiple digital computers through respective low level cache memories. Further, in accordance with the present invention, each low level cache memory stores data words with respective tag bits which identify each data word as being shared, modified or invalid but never exclusive; and, each high level cache memory stores data words with respective tag bits which identify each data word as being shared, modified, invalid, or exclusive.

With the above distributed data processing system, a digital computer begins the execution of a WRITE command by addressing its respective low level cache memory to try to obtain the data word that is to be modified. If the addressed data word is present in the low level cache memory and the shared tag bit is true, then a WRITE REQUEST is sent to the high level cache memory which is coupled to the computer via a processor bus. That high level cache memory then checks its own tag bits for the data word which is to be written. If the shared tag bit is true in the high level cache memory, it then sends a WRITE REQUEST on the system bus in order to prevent any other computer from modifying the same data word. Then, the high level cache memory sends a WRITE GRANT signal back to the low level cache memory; and it changes the tag for the data word which is to be written from shared to modified. On the other hand, if the exclusive tag bit is true in the high level cache memory, then the high level cache memory is able to send that the WRITE GRANT signal back to the low level cache memory without sending any signals on the system bus; and it changes the tag bits for the data word which is to be written from exclusive to modified.30

By comparison, if a data word for a WRITE command was permitted to be stored in a low level cache memory with the exclusive tag bit being true, then that data word could be modified by a digital computer without receiving any WRITE GRANT signal from a high level cache memory. Consequently, two computers on separate processor busses could modify the same data word in their respective low level cache memory differently.

Also, the high level cache memory tracks the data words that get modified by changing those tag bits for the data word from shared to modified or from exclusive to modified. Thereafter, if a READ command occurs on the system bus, the high level cache memory will not send the requested data word on the system bus unless it is storing that data word with a modified tag.

BRIEF DESCRIPTION OF THE DRAWINGS

FIG. 2A shows the format in which data words are stored in the high level cache memories of the FIG. 1 data processing system.

FIG. 2B shows the format in which data words are stored in the low level cache memories of the FIG. 1 data processing system.

FIG. 3 shows a signal sequence which occurs in the FIG. 1 data processing system when a digital computer P1 reads a data word which is present in the main memory but not present in the low level cache memory or the high level cache memory for the P1 computer.

FIG. 4 shows a signal sequence which occurs in the FIG. 1 data processing system when a digital computer P20 reads the same data word which was previously read by the digital computer P1 in FIG. 3.

FIGS. 5A through 5D show a signal sequence which occurs in the FIG. 1 data processing system when the digital computer P1 executes a WRITE command for a shared data word which was previously read in FIGS. 3 and 4.

FIG. 6 shows a signal sequence which occurs in the FIG. 1 data processing system when the digital computer P1 reads a data word which is present in the main memory module but not present in the low level cache memory or the high level cache memory for the computer P1.

FIG. 7 shows a signal sequence which occurs in the FIG. 1 data processing system when the digital computer P1 reads a data word which is present in the high level cache memory, but not present in the low level cache memory, for the computer P1.

FIG. 8A illustrates a signal sequence which occurs in the FIG. 1 data processing system when the digital computer P1 initiates the execution of a WRITE command for an exclusive data word which was previously read in FIGS. 6 and 7.

FIG. 8B shows a signal sequence which completes the WRITE operation that is started in FIG. 8A, under the condition where the digital computers P1 and P20 are not attempting to write the same data word simultaneously.

FIGS. 8B' and 8C' show a signal sequence which completes the WRITE operation that is started in FIG. 8A, under the condition where the digital computers P1 and P20 are attempting to write the same data word simultaneously.

DETAILED DESCRIPTION

Figure 1:
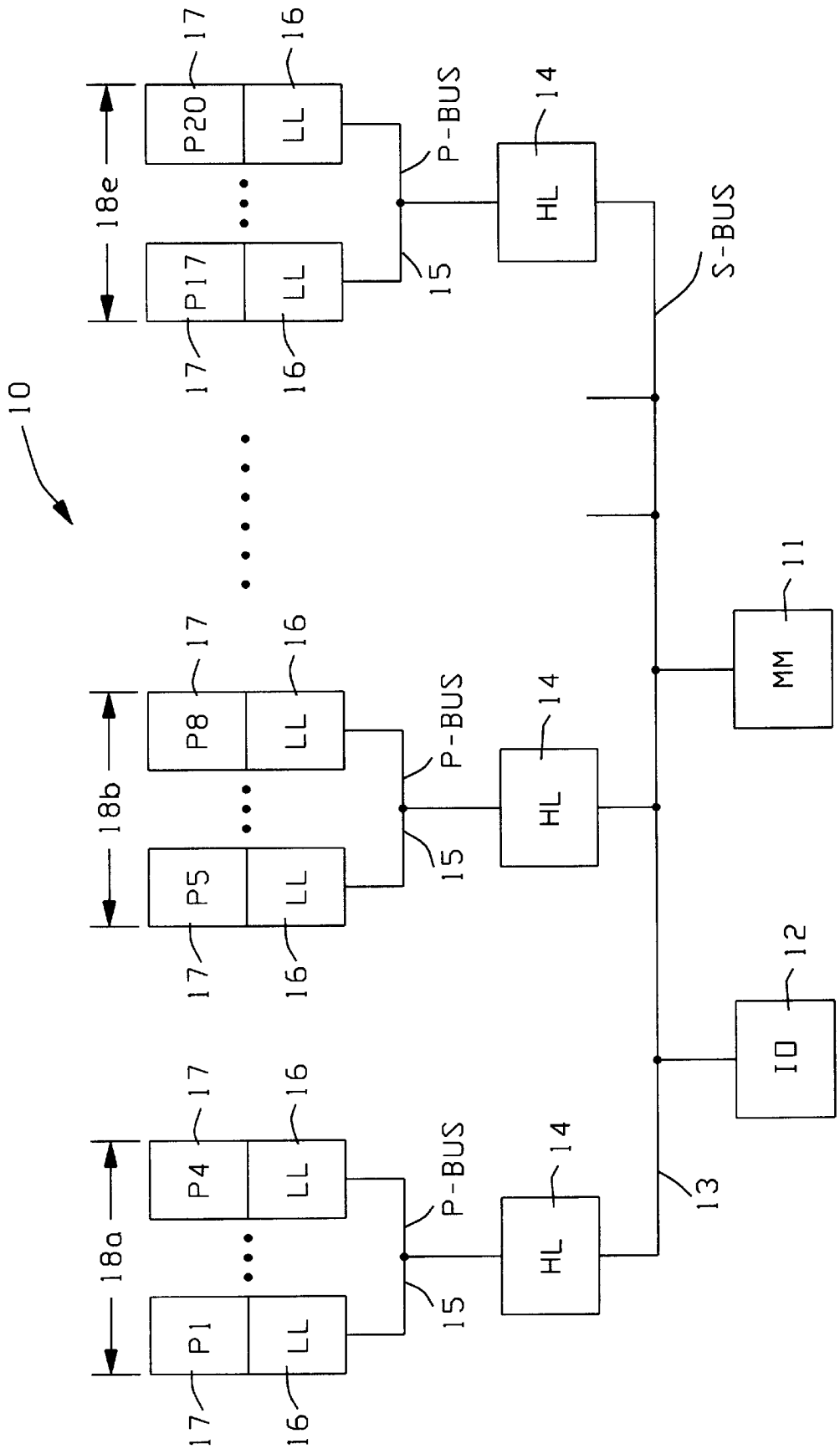
FIG. 1 illustrates a distributed data processing system which constitutes one preferred embodiment of the present invention.

Referring now to FIG. 1, it shows a distributed data processing system 10 which incorporates the present invention. This data processing system 10 includes a main memory module 11 and an Input/Output module 12 which are coupled to a single system bus 13. In FIG. 1, the system bus is labeled S-BUS, the main memory module is labeled MM, and the input/output module is labeled I/O.

Also included in the data processing system 10 are multiple high-level cache memories 14, each of which has a first port coupled to the system bus 11 and a second port which is coupled to a respective processor bus 15. In FIG. 1, each high-level cache memory is labeled HL and each processor bus is labeled P-BUS.

Preferably, the number of high-level cache memories which couple to the system bus varies from one to five. In FIG. 1, only the first, second, and fifth high-level cache memories are illustrated; and the third and fourth high level cache memories are not shown but are indicated as a series of dots.

Further, in data processing system 10, each processor bus is coupled through respective low-level cache memories 16 to one or more digital computers 17. In FIG. 1, the low-level cache memories are labeled LL; and the digital computers are labeled P1 through P20.

Preferably, the number of digital computers on each processor bus ranges from one to four. This is illustrated in FIG. 1 wherein the computers P1–P4 are coupled through respective low-level cache memories to the first processor bus and there form a first data processing cluster 18a. Likewise, the computers P5–P8 are coupled through respective low-level cache memories to the second processing bus and there form a second data processing cluster 18b, etc.

Stored within the high level cache memories 14 are a plurality of data words, where each data word is a predetermined number of bits. Also, in each high level cache memory, each data word 20 is stored with a format 21 as shown in FIG. 2A. This format 21 includes a compare address CA and four tag bits E, S, M, and I. Only one tag bit is true at a time.

Tag bit E is the exclusive tag bit, and it is true when the data word is stored in just a single high level cache memory 14. Tag bit S is the shared tag bit, and it is true when the data word is stored in more than one of the high level cache memories 14. Tag bit M is the modified tag bit, and it is true when the data word has been modified by one of the computers which is coupled by the processor bus to the high level cache memory. Tag bit I is the invalid tag bit, and it is true when the data word in the high level cache memory cannot be used.

Similarly, stored within the low level cache memories 16 are a plurality of data words, where each data word is a predetermined number of bits. But in each low level cache memory, each data word 22 is stored with a format 23 as shown in FIG. 2B. This format 23 includes a compare address and just three of the above-described tag bits S, M, and I. Tag bit E, the exclusive bit, is always false.

Now, in order to illustrate the processes by which the data words and tag bits are loaded and modified in the high level cache memories and the low level cache memories, FIGS. 3 through 8C' are provided. Each of these figures is a simplified representation of the FIG. 1 system in which only two of the five data processing clusters are shown, but in which various signal sequences which occur during READ and WRITE operations are illustrated by dashed lines.

In FIG. 3, the dashed lines 31 and 32 identify two signal sequences which occur when the digital computer P1 executes a READ command for a data word which is present in the main memory module but not present in its low level cache memory or the high level cache memory for cluster 18a. In signal sequence 31, the READ command RD is initially transferred to the low level cache memory for the digital computer P1. Then, when that low level cache memory determines that it does not have the requested data word, the READ command RD is sent on the processor bus to the high level cache memory for cluster 18a. Later, when the high level cache memory for cluster 18a determines that it does not have the requested data word, the READ command is sent on the system bus to the main memory module MM.

In response, the main memory module sends the requested data word on the signal sequence 32 to the high level cache memory for the cluster 18a. That data word is then stored in the high level cache memory, where it is tagged as being exclusive; and this is indicated in FIG. 3 by the letter E. Thereafter, the data word is sent in the signal sequence 32 to the low level cache memory for the digital computer P1. But, in that low level cache memory, the data word is tagged as being shared; and this is indicated in FIG. 3 by the letter S.

Next, in FIG. 4, a process is illustrated wherein the digital computer P20 reads the same data word which was previously read by the digital computer P1 in FIG. 3. To perform this process, three signal sequences occur which are identified by the dashed lines 35, 36, and 37.

In the signal sequence 35, a READ command RD is sent from the digital computer P20 through its low level cache memory and the high level cache memory for cluster 18e to the main memory module. During the time that this READ command is present on the system bus, the high level cache memory for cluster 18a snoops on the system bus and senses that the READ command is for a data word which it has internally stored. This is indicated in FIG. 4 as snoop 36.

In response to the snoop operation 36, the high level cache memory for cluster 18a sends a SHARED control signal 37 on the system bus. This control signal 37 indicates to the high level cache memory for cluster 18e that the requested data word is shared. At the same time, the high level cache memory for cluster 18a changes its tag bits for the requested data word from exclusive to shared, and this is indicated in the high level cache memory for cluster 18a by the symbol E→S.

Subsequently, the requested data word is sent from the main memory to module to the high level cache memory for cluster 18e. This passage of the data word occurs in the signal sequence 38. After this data word is stored in the high level cache memory for cluster 18c, the data word is sent in the signal sequence 38 to the low level cache memory for the digital computer P20. In both the high level cache memory for cluster 18e and the low level cache memory for computer P20, the data word is stored as shared; and this is indicated in those memories by the letter S.

Next, in FIGS. 5A through 5D, a process is illustrated whereby the digital computer P1 executes a WRITE command for the shared data word which was previously read in FIGS. 3 and 4. To begin this process, two signals occur which are indicated by the dashed lines 40 and 41 in FIG. 5A. Signal 40 is a WRITE REQUEST signal WR which is sent from the low level cache memory for the digital computer P1 to the high level cache memory for cluster 18a. Then, in response, a DEFER signal 41 is sent from the high level cache memory for cluster 18a to the low level cache memory for the digital computer P1.

Thereafter, a WRITE REQUEST signal WR 42 is sent from the high level cache memory for cluster 18a onto the system bus, and this is shown in FIG. 5B. This WRITE REQUEST signal is placed on the system bus so that it can be sensed by the high level cache memory for cluster 18e; and this sensing is indicated in FIG. 5B as a snoop operation 43.

In response to the snoop operation 43, the tag for the data word which was read during the process of FIG. 4 is changed from shared to invalid in the high level cache memory for cluster 18e. Then, the high level cache memory for cluster 18e sends an INVALIDATE command to the low level cache memory for the digital computer P20, and this as indicated as signal 44 in FIG. 5C. That command causes the tag for the data word which was read during the process of FIG. 4 to be changed from shared to invalid in the low level cache memory for computer P20. Each change in the tag bits in FIG. 5C is indicated by the symbol S→I.

Figure 5D:
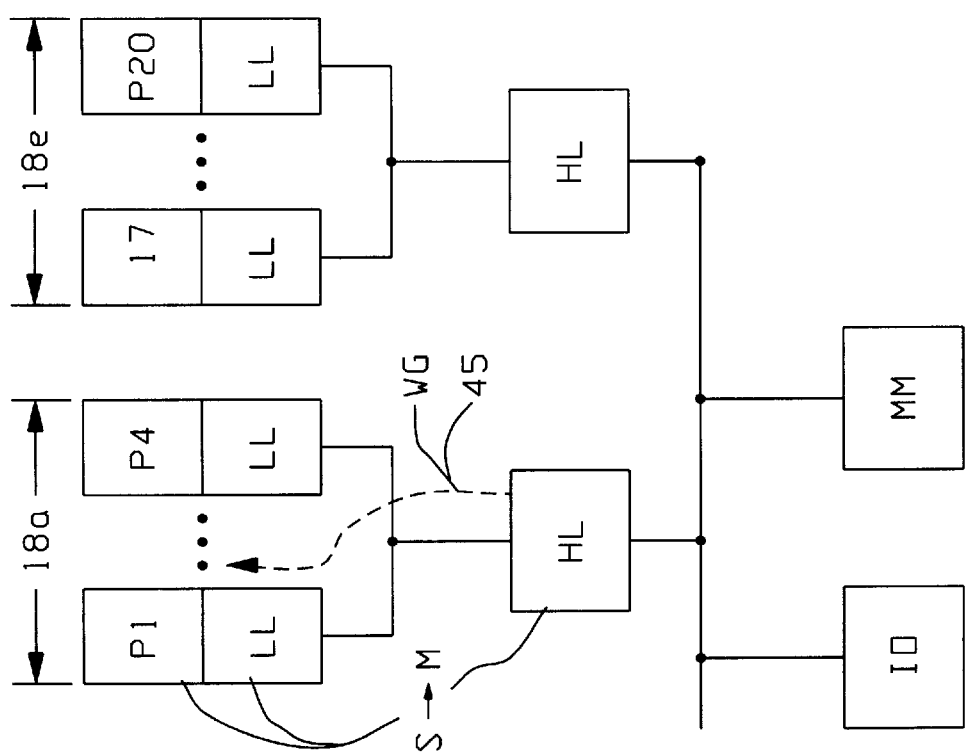
Figure 5C:
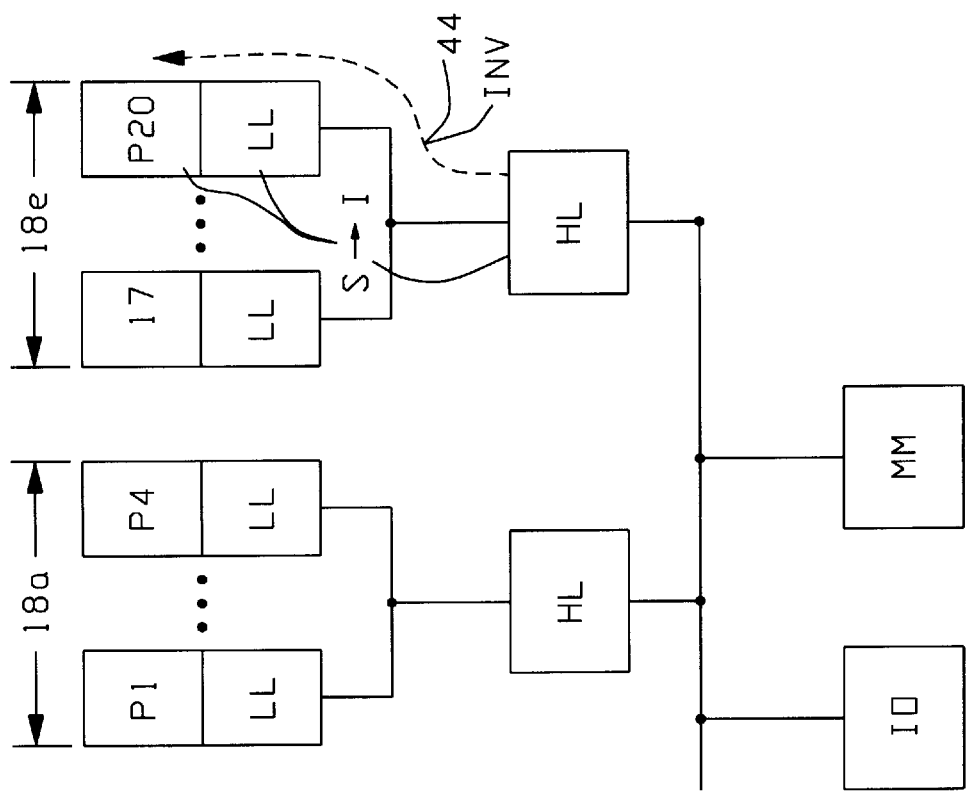

Concurrent with the operations of FIG. 5C, additional operations occur which are shown in FIG. 5D. Initially, the high level cache memory for cluster 18a changes its tag bits, for the data word which is used by the WRITE command, from shared to modified. Then, a WRITE GRANT signal WG is sent from the high level cache memory for cluster 18a to the low level cache memory for computer P1, and this is indicated as signal 45. In response, that low level cache memory changes its tag bits, for the data word which is used by the WRITE command, from shared to modified. Each change in the tag bits in FIG. 5D is indicated in FIG. 5D by the symbol S→M.

Based on the signal sequences which have been described above in conjunction with FIGS. 5A–5D, it is evident that the execution of a WRITE command, which operates on shared data, is a complex operation. This is due to all of the signals which must be sent during the sequences 40–45. By comparison, when a WRITE command is executed which operates on exclusive data, the complexity is greatly reduced; and this will now be explained in conjunction with FIGS. 6–8C'.

To begin, in FIG. 6, the dashed lines 51 and 52 indicate two signal sequences which are used when the digital computer P1 initially reads a data word from the main memory module. These signal sequences 51 and 52 respectively correspond to the signal sequences 31 and 32 which were previously described in conjunction with FIG. 3. Due to the READ operation in FIG. 6, a data word is sent from the main memory module to the high level cache memory for cluster 18a and is therein tagged as exclusive. That same data word is then transferred to the low level cache memory for the digital computer P1 and is therein tagged as shared.

Later, the data word which is read during the FIG. 6 process may subsequently be deleted from the low level cache memory for the digital computer P1 but kept in the high level cache memory for cluster 18a. This will occur if the low level cache memory has a smaller storage capacity than the high level cache memory, and another READ command is executed which causes the data in the low level cache memory to be replaced.

After the above replacement occurs in the low level cache memory for the digital computer P1, that digital computer can again try to read the same data word which got replaced; and the execution of such a READ command is illustrated in FIG. 7. Initially, the READ command is sent from processor P1 to its low level cache memory. Then, when the low level cache memory determines that it does not have the requested data word, the READ command is sent as signal 55 to the high level cache memory for cluster 18a. That high level cache memory then determines that it stored the requested data word as exclusive data; and it returns the requested data word as signal 56 back to the low level cache memory for processor P1.

Now, suppose that processor P1 executes a WRITE command which uses the exclusive data word that is stored in the high level cache memory for cluster 18a. This execution of the WRITE command can occur in two different ways; one of which is illustrated in FIGS. 8A and 8B, and the other of which is illustrated in FIGS. 8A, 8B' and 8C'.

In FIG. 8A, the execution of the WRITE command by the digital computer P1 causes a WRITE REQUEST signal 60 to be sent from the low level cache memory for the digital computer P1 to the high level cache memory for cluster 18a. When the WRITE REQUEST signal is received, the high level cache memory for cluster 18a determines that it is internally storing, as exclusive data, the data word which is to be written. In response to that determination, the high level cache memory for cluster 18a sends a RETRY signal 61 back to the low level cache memory for the digital computer P1.

While the above-described signals 60 and 61 are occurring, the high level cache memory for cluster 18a also snoops on the system bus in order to see whether or not a WRITE REQUEST signal is being sent on the system bus by any other high level cache memory. This snoop operation is indicated in FIG. 8a as snoop 62; and the WRITE REQUEST signal which may or may not be present of the system bus from another high level cache memory is indicated as WR 63.

If no WRITE REQUEST signal is detected on the system bus which uses the same data word that digital computer P1 is attempting to WRITE, then the tag for that data word is changed from exclusive to modified in the high level cache memory for cluster 18a; and this is indicated by the symbol E→M in FIG. 8B. Then, the execution of that WRITE command proceeds to completion by the signal sequence of FIG. 8B.

Conversely, if a WRITE REQUEST signal is detected on the system bus which uses the same data word which computer P1 is attempting to WRITE, then the tag for that data word is changed in the high level cache memory for cluster 18a from exclusive to invalid; and this is indicated by the symbol E→I in FIG. 8B'. Then, the execution of the WRITE command proceeds to completion by the signal sequences which are shown in FIGS. 8B' and 8C'.

As a practical matter, the probability is extremely small that a WRITE REQUEST signal will occur on the system bus during the snoop operation 62 which uses the same data word that the digital computer P1 is attempting to write. Consequently, the execution of the WRITE command from the digital computer P1 will almost always proceed as shown in FIG. 8B.

In FIG. 8B, the low level cache memory for the digital computer P1 sends another WRITE REQUEST signal 70 back to the high level cache memory for cluster 18a. This second WRITE REQUEST signal is sent in response to the RETRY signal 61 which occurs in FIG. 8A. Then the high level cache memory for cluster 18a responds to the WRITE REQUEST signal 70, and the modified tag for the data word which is to be written, by sending a WRITE GRANT signal 71 back to the low level cache memory for the digital computer P1.

In FIG. 8B', the high level cache memory for cluster 18a responds to WRITE REQUEST signal 63 which occurred on the system bus by sending an INVALIDATE command 64 back to the low level cache memory for the digital computer P1. Also, in response to the WRITE REQUEST signal 63 on the system bus, another signal sequence 65 occurs in which the data word that is to be written by the digital computer P20 is transferred from the main memory to the high level cache memory for cluster 18e. There, the received data word is tagged as modified. Then, the same data word is transferred to the low level cache memory for the digital computer P20 where is it is also tagged as modified.

Thereafter, the signal sequence of FIG. 8C' occurs in which the second WRITE REQUEST signal 80 is sent to the high level cache memory for cluster 18a. In response to that WRITE REQUEST signal, and the invalid tag for the data word which is to be written, the high level cache memory for cluster 18a sends a DEFER signal 81 back to the low level cache memory for the digital computer P1. Then, the high level cache memory for cluster 18a sends a READ command 82 on the system bus for the data word which the digital computer P1 is attempting to write.

While the READ command 82 is on the system bus, that command is detected in the high level cache memory for cluster 18e; and this detection is indicated in FIG. 8C' as a snoop operation 83. Next, the high cache memory for cluster 18e determines that the READ command 82 is for the same data word which it previously stored internally during the signal sequence 65. In response to that determination, the high level cache memory for cluster 18e sends a DEFER signal 84 on the system bus to the high level cache memory for cluster 18a. This DEFER signal 84 indicates that the data which was requested by the READ signal 82 will come from a source other than the main memory and thus will be delayed.

Thereafter, the high level cache memory for cluster 18e internally retrieves the data word for the READ command 82 and it internally tags that data word as invalid. Further, the high level cache memory for cluster 18e sends an INVALIDATE command 85 to the low level cache memory for digital computer P20 which causes the retrieved data word to there be tagged as invalid. Then, the high level cache memory for cluster 18e sends the retrieved data word on the system bus to the high level cache memory for cluster 18a, and this is indicated by the signal sequence 86. When that data word is received, the high level cache memory for cluster 18a, responds by sending the data word and a WRITE GRANT signal to the low level cache memory for the digital computer P1.

Figure 9:
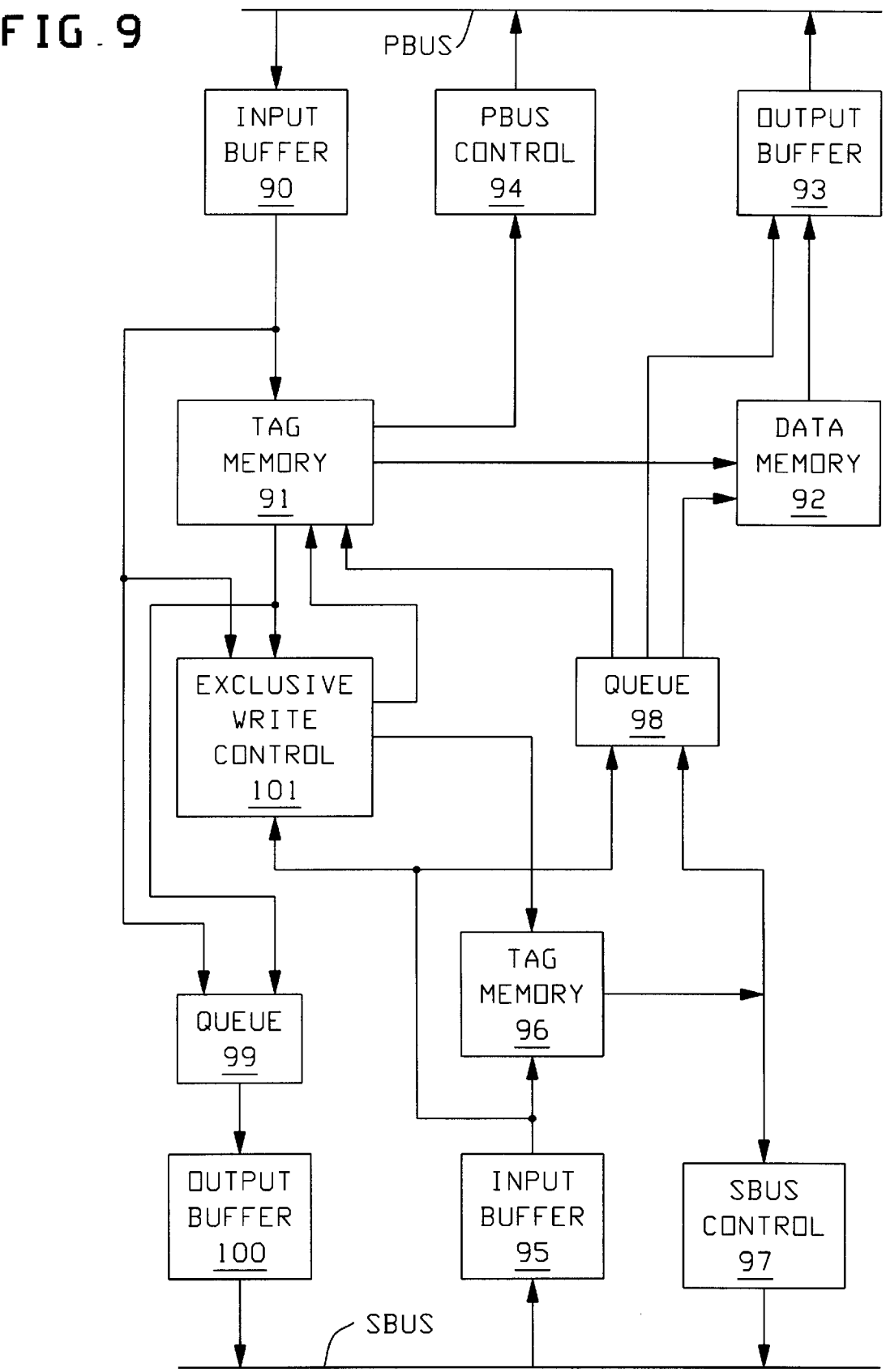
FIG. 9 shows a preferred circuit for each of the high level cache memories which are in the FIG. 1 system.

Turning now to FIG. 9, a preferred circuit for the high level cache memory will be described which performs all of the signal sequences of FIGS. 3 through 8C'. This FIG. 9 circuit is comprised of twelve modules 90–101 which are intercoupled to each other as shown. Each of these modules 90–101 is described below in TABLE 1.

TABLE 1

| Module | Description |
|---|---|
| 90 | Module 90 is an input buffer for receiving signals from the processor bus. These signals which are received include the READ commands of FIGS. 3, 6, and 7; and the WRITE REQUESTS of FIGS. 5A, 8A, 8B, and 8C'. |
| 91 | Module 91 is a tag-memory which stores a plurality of compare addresses and the four tag bits (E, S, M, and I) for each stored address. Tag-memory 91 internally generates a MATCH signal when a READ command or a WRITE REQUEST is received, from the processor bus input buffer 90, with an address that equals a compare address which is stored in the tag-memory 91. In response to that MATCH signal and the tag bits for the matching compare address, various signals are generated by the tag-memory 91 on its outputs. |
| 92 | Module 92 is a data-memory which stores a plurality of data words. One such data word is stored in this data-memory for each compare address that is stored in the tag-memory 91. These data words are addressed by the data-memory inputs and read from its output. |
| 93 | Module 93 is an output buffer which sends data words and INVALIDATE commands on the processor bus. Data words are sent in FIGS. 3 and 6, and the INVALIDATE commands are sent in FIGS. 8B' and 8C'. |
| 94 | Module 94 is a circuit which sends control signals on the processor bus under the direction of the tag-memory 91. These control signals include the DEFER signal in FIGS. 5A and 8C', the WRITE GRANT signal WG in FIGS. 5D and 8B, and the RETRY signal in FIG. 8A. |
| 95 | Module 95 is an input buffer which receives, from the system bus, the data word which occurs on the system bus in FIGS. 3, 4, 6, 7, and 8B' and 8C'. Also, module 95 receives the system bus signals that occur during the snoop operations in FIGS. 4, 5B, 8A and 8C'. |
| 96 | Module 96 is a tag-memory which stores the same compare addresses and tag bits (E, S, M, and I) for each stored address, as the above-described tag-memory 91. Tag-memory 96 operates in parallel with and independent of tag-memory 91. Tag-memory 96 internally generates a MATCH signal during the snoop operation in FIGS. 4, 5B, 8A, and 8C', if an address from the system bus is detected in the input buffer 95 which equals a compare address that is stored in the tag-memory 96. |

TABLE 1-continued

Figure 18:
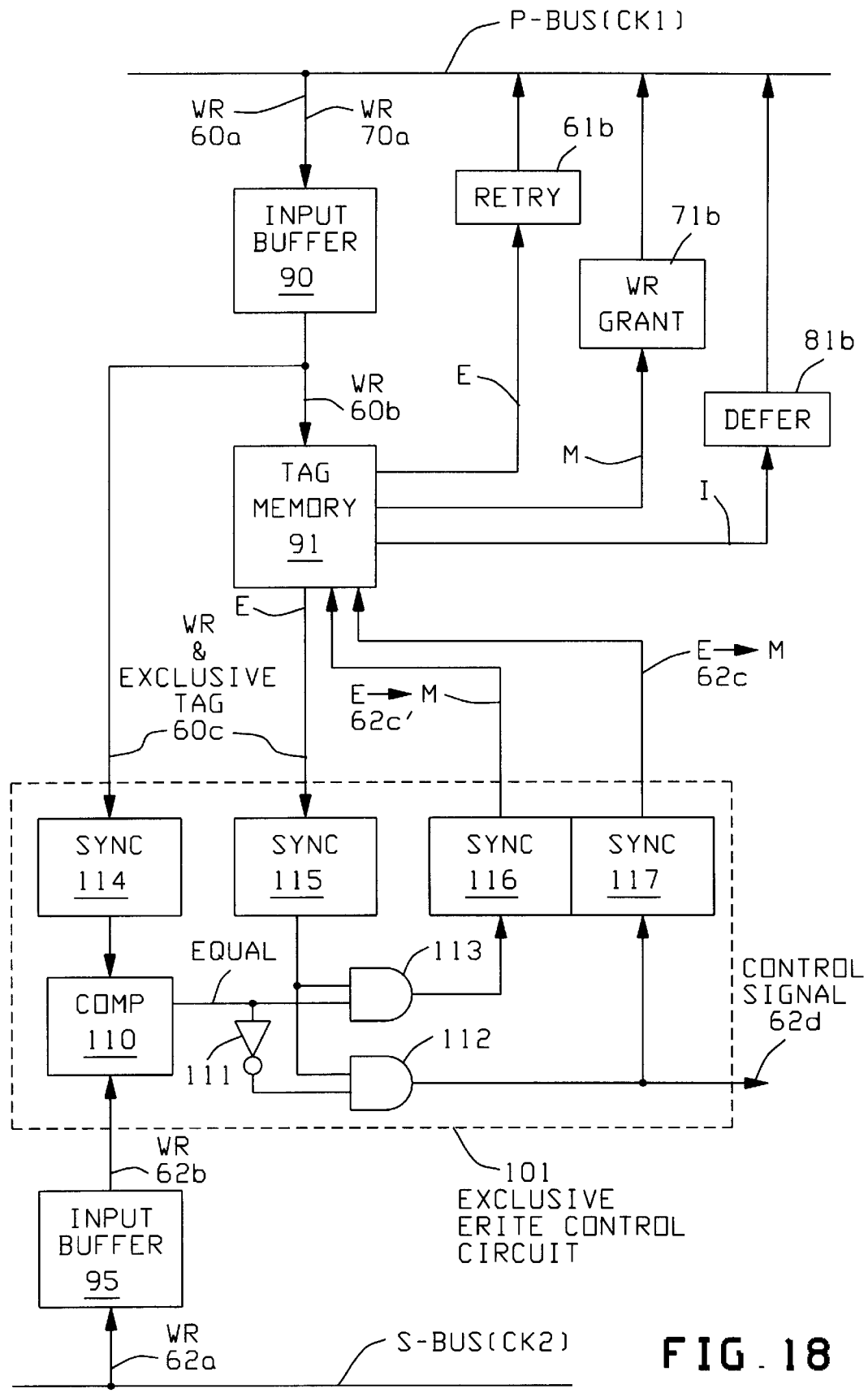
FIG. 18 shows one preferred internal structure for module 101 which is included within the high level cache memory of FIG. 9.

| Module | Description |
|---|---|
| | In response to that MATCH signal and the tag bits for the matching compare address, tag-memory 96 generates various control signals on its output. |
| 97 | Module 97 is a circuit which sends control signals on the system bus under the direction of the tag-memory 96. These control signals include the SHARED signal in FIG. 4, and the DEFER signal in FIG. 8C'. |
| 98 | Module 98 is a first-in-first-out queue which receives inputs from the system bus input buffer 95 and tag-memory 96. In response to those inputs, module 98 may change the state of the tag bits in tag-memory 91, write a data word into the data-memory 92, read a data word from the data-memory 92, or send an INVALIDATE command to the output buffer 93. |
| 99 | Module 99 is a first-in-first-out queue which receives inputs from the input buffer 90 and the tag-memory 91. In response to those inputs, module 99 may initiate several operations on the system bus. These operations include sending a READ command RD on the system bus in FIGS. 3, 4, and 6, sending a WRITE REQUEST WR on the system bus in FIGS. 5B and 8A, and sending a data word on the system bus in FIG. 8C'. |
| 100 | Module 100 is an output buffer which sends signals on the system as initiated by module 99. |
| 101 | Module 101 is a write control logic circuit which implements the signal sequences for writing exclusive data words as shown in FIGS. 8A, 8B, and 8B'. These signal sequences include causing the RETRY signal to occur in FIG. 8A and causing the tag bit changes of E → M and E → I to occur in FIGS. 8B and 8B'. A detailed circuit diagram of one preferred embodiment for module 101 is shown in FIG. 18. |

Now, in order to explain how all of the modules in the high level cache memory of FIG. 9 interact with each other, FIGS. 10–17 are provided. Each of the FIGS. 10–17 is the replication of the FIG. 9 circuit; but in addition, they include reference numerals which show in detail how the signal sequences of FIGS. 3–8C' occur in the FIG. 9 circuit.

Figure 10:
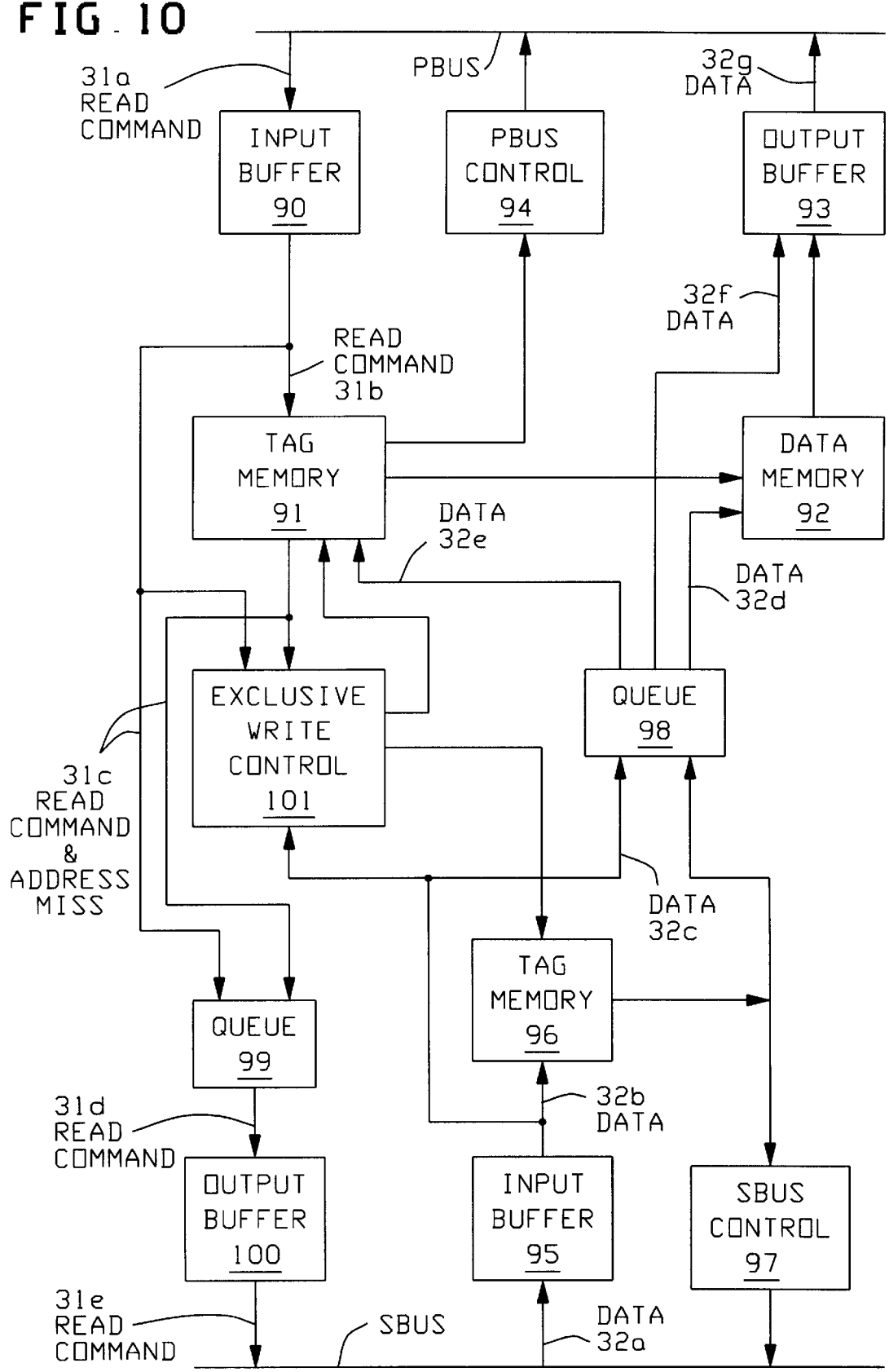
FIG. 10 shows how all of the modules in the high level cache memory of FIG. 9 interact during the signal sequences 31 and 32 of FIG. 3.

For example, in FIG. 10, the reference numerals 31a through 31e indicate how the READ command 31 of FIG. 3 is processed by the high level cache memory for cluster 18a. Initially, this READ command is received from the processor bus by the input buffer 90 as indicated by reference numeral 31a. That READ command is then sent to the Tag-memory 91 as indicated by reference numeral 31b. Tag-memory 91 then determines that the READ command which it received has an address which does not equal any of the compare addresses that are stored within the tag-memory 91. Consequently, the READ command is forwarded by tag-memory 91 to the queue 99; and this is indicated by reference numeral 31c. From the queue 99, the READ command passes to the output buffer 100 as indicated by reference numeral 31b; and then the READ command is sent to the system bus as indicated by reference numeral 31e.

Similarly in FIG. 10, reference numerals 32a through 32g indicate how the data word 32 which is read in FIG. 3 is operated on by the high level cache memory for cluster 18a. Initially, this data word is received from the system bus by the input buffer 95 as indicated by reference numeral 32a. Then, the address for the received data word is written into the tag-memory 96 as a compare address; and the corresponding tag bits are set in tag-memory 96 to the exclusive state. This is indicated by reference numeral 31b. Next, the data received word is transferred from the input buffer 95 to the queue 98 as indicated by reference numeral 32c. Thereafter, that data word is written into the data RAM 92 as indicated by reference numeral 32d. Also, the address of the data word in queue 98 is written into the tag-memory 91 as a compare address, and the tag bits for that compare address are set to the exclusive state. This is indicated by reference numeral 32e. Then, the data word is transferred from the queue 98 to the output buffer 93 as indicated by reference numeral 32f; and from the output buffer, the data word is sent to the processor bus as indicated by reference numeral 32g.

Figure 11:
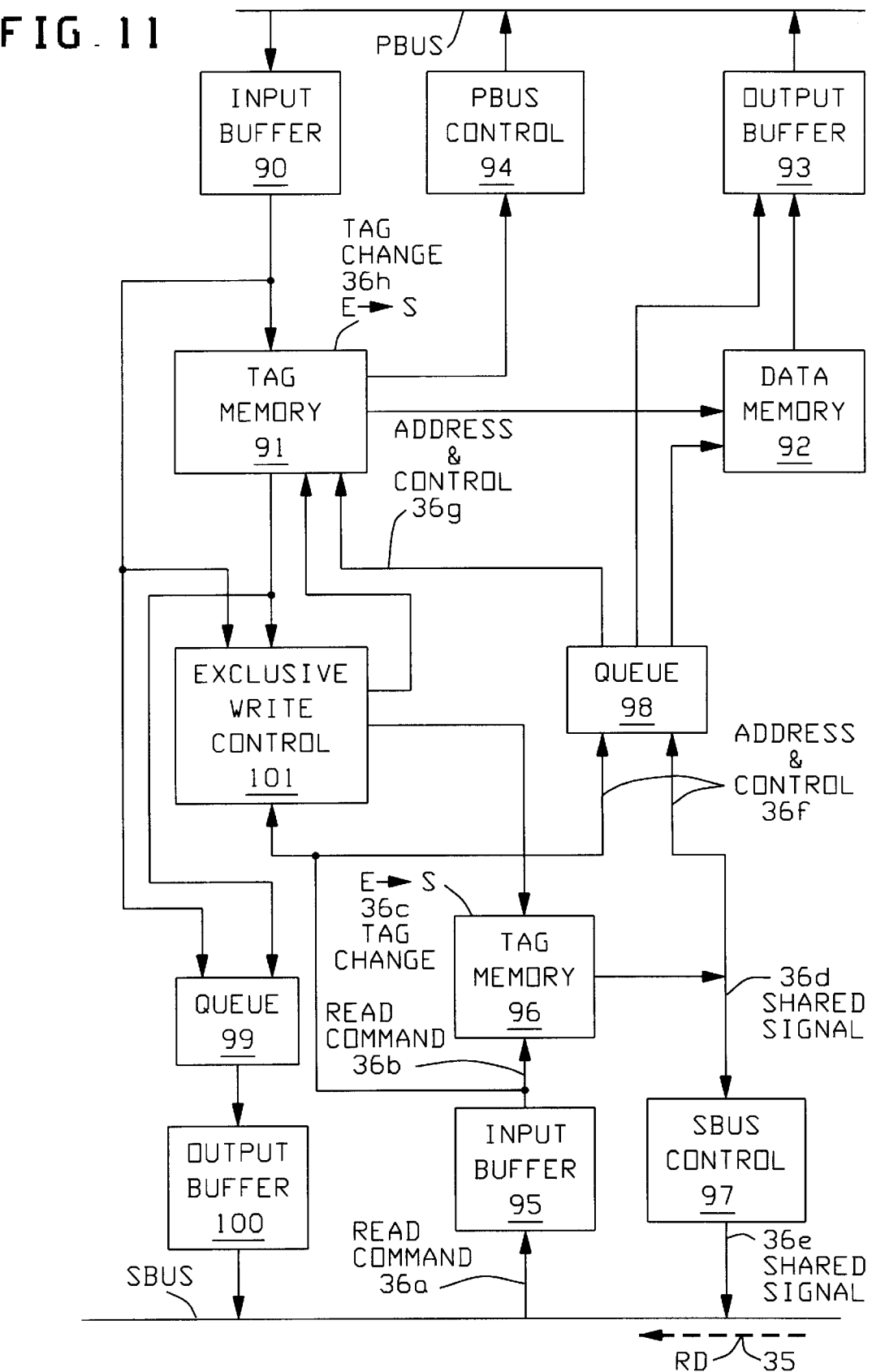
FIG. 11 shows all of the modules in the high level cache memory of FIG. 9 interact during the signal sequence 36 of FIG. 4.

In FIG. 11, reference numerals 36a–36g indicate how the snoop operation 36 of FIG. 4 occurs in the high-level cache memory for cluster 18a. This snoop operation begins by receiving in the input buffer 95, the READ command 35 which is sent on the system bus by the high level cache memory for cluster 18e; and this is indicated by reference numeral 36a. Then, the READ command is sent from input buffer 95 to the tag-memory 96 as indicated by reference numeral 36b; and in the tag-memory 96, a MATCH signal is generated which indicates that the READ command has an address which equals a compare address that is stored within the tag-memory. In response to that MATCH signal, the tag bits for the matching compare address are changed from exclusive to shared as indicated by reference numeral 36c. Also, in response to that MATCH signal, the tag-memory 96 directs the control circuit 97 to send a SHARED control signal on the system bus, and this is indicated by reference numerals 36d and 36e. Further in response to the MATCH signal in the tag-memory 96, that tag memory causes the matching compare address to be loaded along with a control signal into the queue circuit 98 as indicated by reference numeral 36f. This control signal and matching compare address is then transferred to the tag-memory 91 when it is not busy as indicated by reference numeral 36g; and the tag-memory 91 responds to the control signal by changing its tag-bits for the matching compare address from exclusive to shared as indicated by reference numeral 36h.

Figure 12:
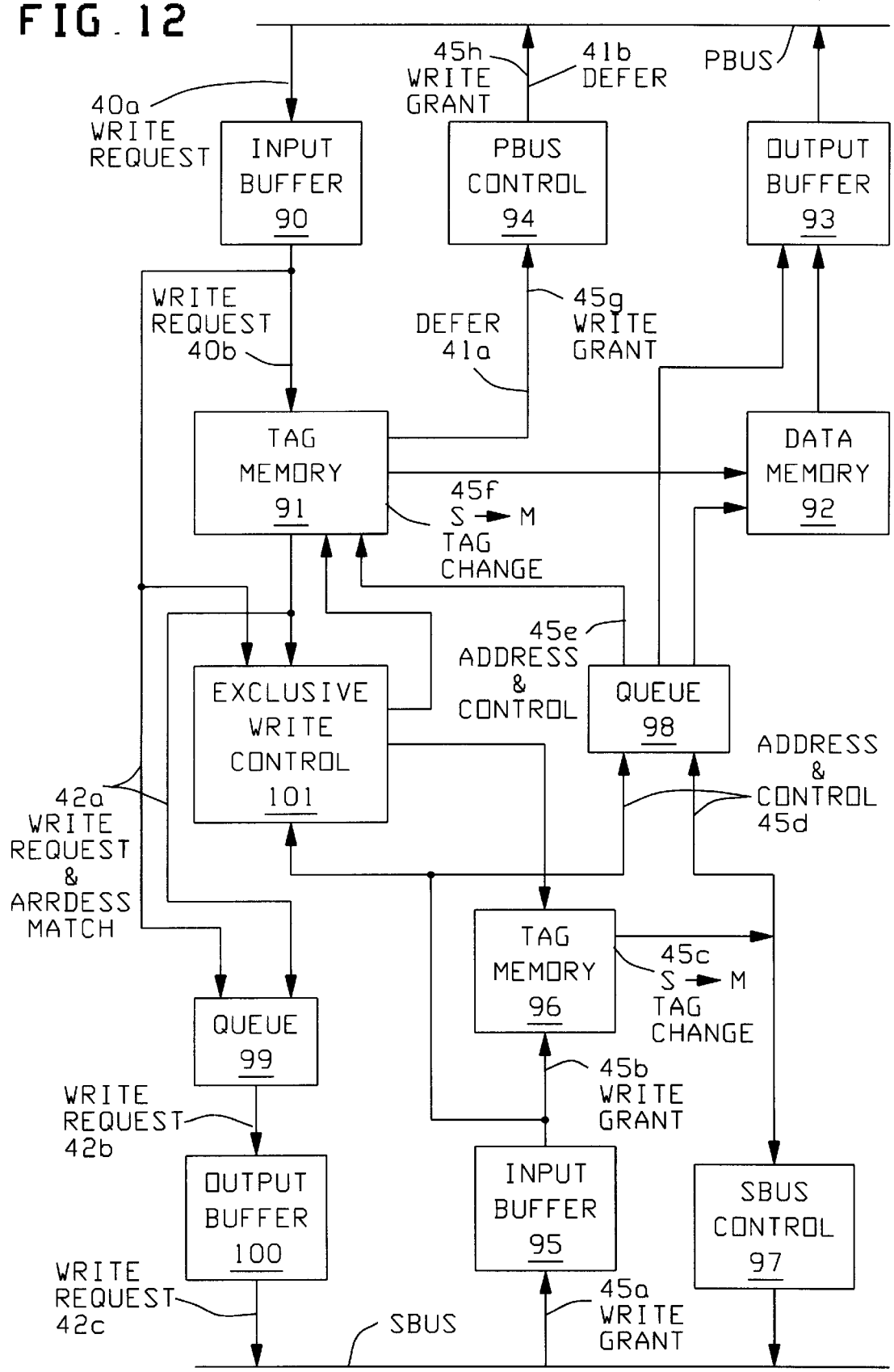
FIG. 12 shows how all of the modules in the high level cache memory of FIG. 9 interact to during the signal sequences 40, 41, 42, and 45 of FIGS. 5A–5D.

Next, FIG. 12 shows the signal sequences 40, 41, 42, and 45 which occur in the high-level cache memory for cluster 18a during the WRITE operations of FIGS. 5A–5D. Initially, a WRITE request signal WR is received from the processor bus in the input buffer 90 as indicated by reference numeral 40a. Then, the WRITE request signal is sent to the tag-memory 91 wherein a MATCH signal is generated. This MATCH signal indicates that the WRITE request is for a data word which has an address that equals a compare address in the tag-memory 91. In response to that MATCH signal and the shared tag bits for the compare address, the tag-memory 91 directs the control circuit 95 to send a DEFER signal on the processor bus; and this is indicated by reference numerals 41a and 41b. Also, in response to the MATCH signal and the shared tag bits for matching the compare address, the WRITE request is transferred into the circuit 99 as indicated by reference numeral 42a. That WRITE request is then sent through the output buffer 100 to the system bus as indicated by reference numerals 42b and 42c.

In response to the WRITE request signal 42c, a WRITE GRANT signal WG is returned on the system bus from the main memory module; and this WRITE GRANT signal is loaded into the input buffer 95 as indicated by reference numeral 45a. Then, the WRITE GRANT signal is transferred to the tag-memory 96 as indicated by reference numeral 45b. In the tag-memory 96, a MATCH signal is generated which indicates that the received WRITE GRANT is for a data word which has an address that equals a compare address in the tag-memory 96. Then in response to the MATCH signal, the tag bits for the matching compare address are changed from shared to modified as indicated by reference numeral 45c.

Further in response to the MATCH signal in the tag-memory 96, that tag memory causes the matching compare address to be loaded along with a control signal into the queue circuit 98 as indicated by reference numeral 45d. This control signal and matching compare address is then transferred to the tag-memory 91 when it is not busy as indicated by reference numeral 45e; and the tag-memory 91 responds to the control signal by changing its tag-bits for the matching compare address from shared to modified as indicated by reference numeral 45f. Then, the tag-memory 91 directs the control circuit 94 to send the WRITE GRANT signal on the processor bus as indicated by reference numerals 45g and 45h.

Figure 13:
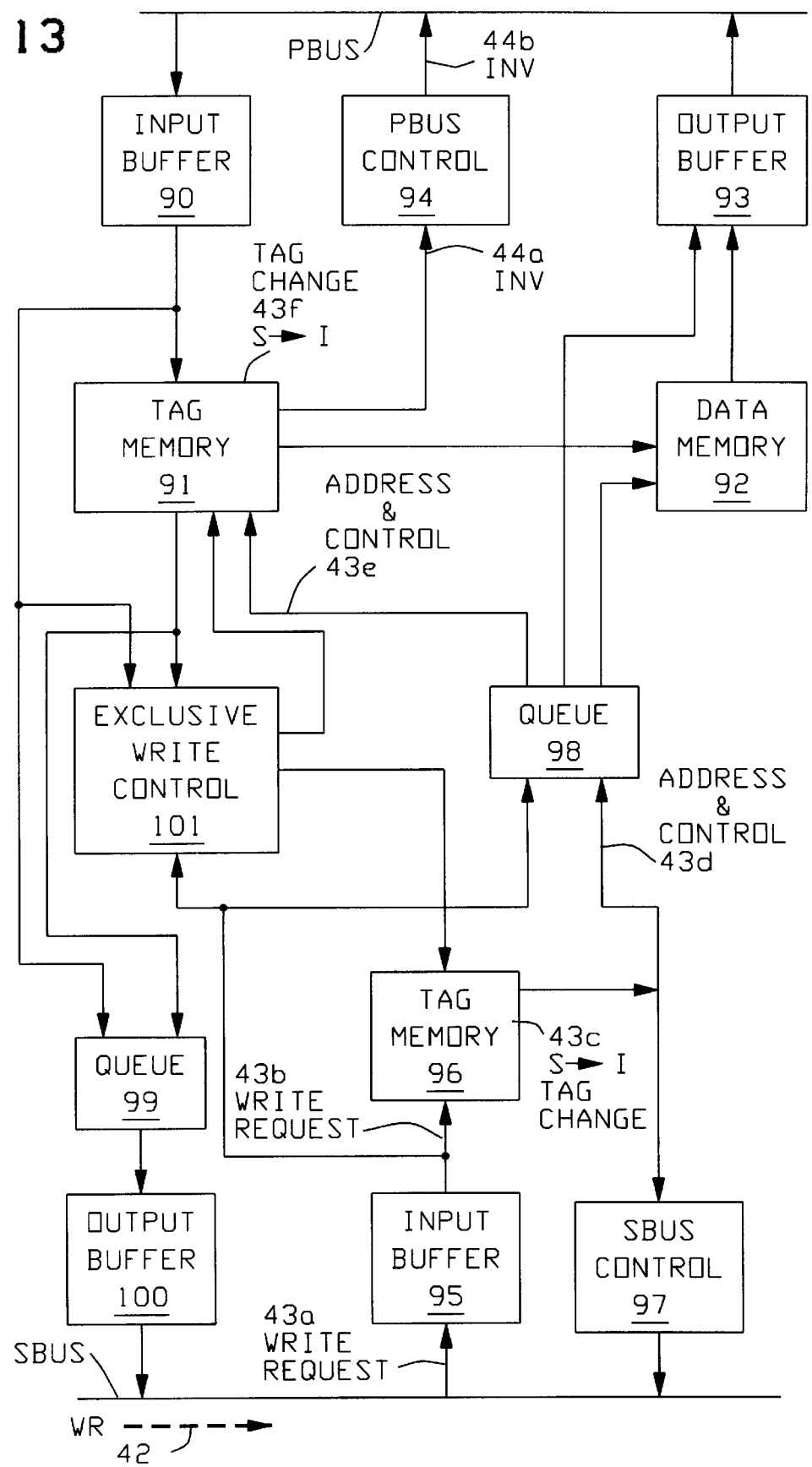
FIG. 13 shows how all of the modules in the high level cache memory of FIG. 9 interact during the signal sequences 43 and 44 in FIGS. 5B and 5C.

Next, in FIG. 13, reference numerals 43a–43e, and 44a–44b respectively indicate how the snoop operation 43 and the invalidate operation 44 is performed by the high-level cache memory for cluster 18e in FIGS. 5B and 5C. Initially, the snoop operation begins by loading into the input buffer 95, the WRITE REQUEST signal WR which is sent on the system bus in FIG. 5B; and this is indicated by reference numeral 43a. That WRITE REQUEST signal is then transferred from the input buffer 95 to the tag-memory 96 wherein a MATCH signal is generated. This MATCH signal indicates that the WRITE REQUEST is for a data word which has an address that equals a compare address in the tag-memory 96. In response to that MATCH signal, the tag bits for the matching compare address are changed in tag-memory 96 from shared to invalid as indicated by reference numeral 43c. Further in response to the MATCH signal in the tag-memory 96, that tag memory causes the matching compare address to be loaded along with a control signal into the queue circuit 98 as indicated by reference numeral 43d. This control signal and matching compare address is then transferred to the tag-memory 91 when it is not busy as indicated by reference numeral 43e; and the tag-memory 91 responds to the control signal by changing its tag-bits for the matching compare address from shared to invalid as indicated by reference numeral 43f. Then, the tag-memory 91 directs the control circuit 94 to send an invalidate command on the processor bus as indicated by reference numerals 44a and 44b.

Figure 14:
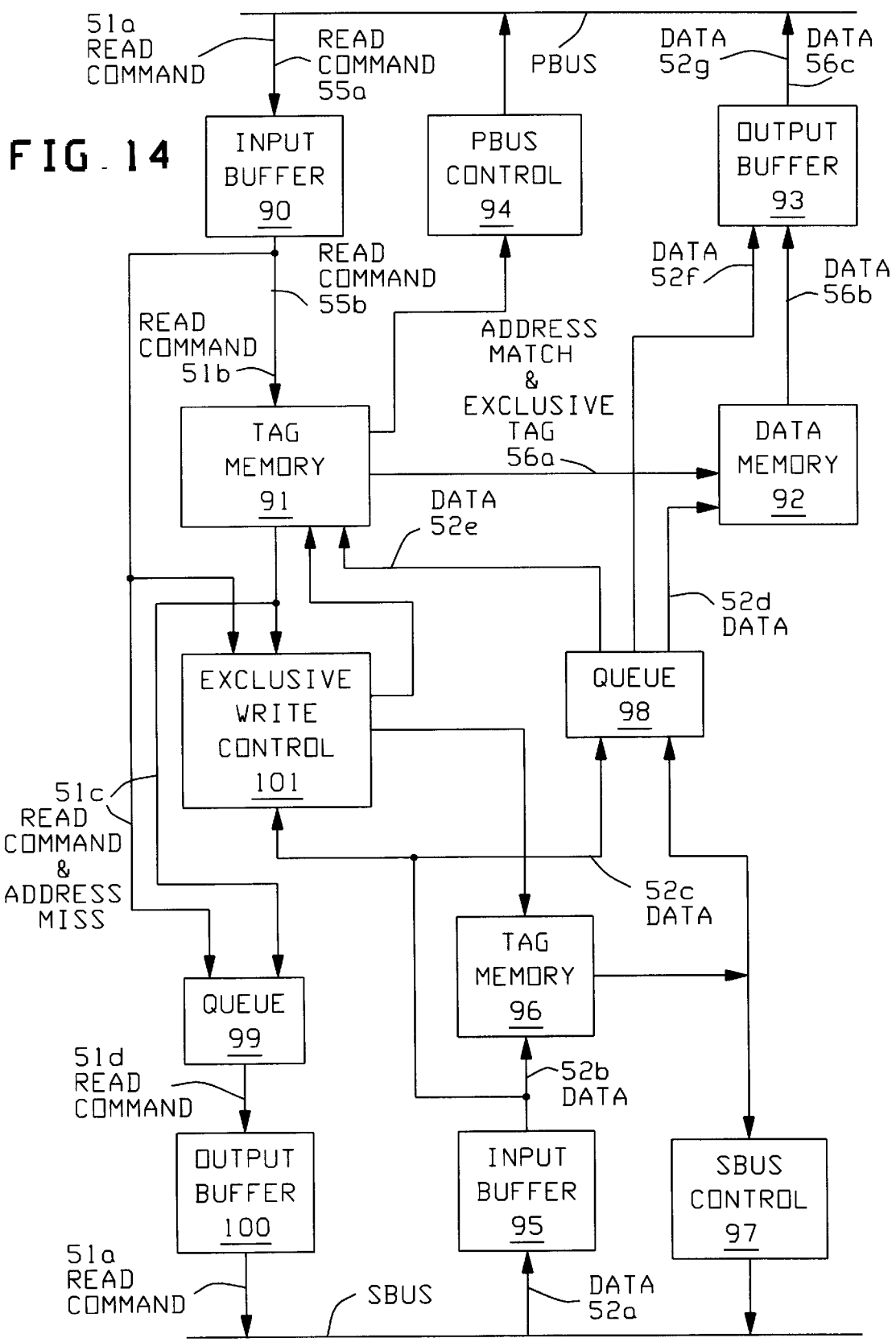
FIG. 14 shows how all of the modules in the high level cache memory of FIG. 9 interact during the signal sequences 51, 52, 55 and 56 of FIG. 6.

Next, in FIG. 14, reference numerals 51a through 51e indicate how the READ command 51 of FIG. 3 is processed by the high-level cache memory for cluster 18a. Also, in FIG. 14, reference numerals 52a through 52g indicate how the data word 52 which is read in FIG. 6, is operated on by the high-level cache memory for cluster 18a. Signal sequence 51a–51e is identical to the signal sequence 31a–31e which has already been described in conjunction with FIG. 10, and thus its description need not be repeated. Similarly, signal sequence 52a–52g is identical to the signal sequence 32a–32g which has already been described in conjunction with FIG. 10, and thus its description need not be repeated.

Also, in FIG. 14, reference numerals 55a–55b and 56a–56c respectively indicate how the READ command 55 and data word 56 of FIG. 7 are operated on by the high-level cache memory for cluster 18a. Initially, the READ command is received from the processor bus in the input buffer 90 as indicated by reference numeral 55a. Then, the READ command is transferred to the tag-memory 91 as indicated by reference numeral 55b wherein a MATCH signal is generated. This MATCH signal indicates that the READ command is for a data word which has an address that equals a compare address in the tag-memory 91. In response to that MATCH signal and the exclusive state of the tag bits for the matching compare address, a control signal is sent from the tag-memory 91 to the data RAM 92 as indicated by reference numeral 56a. This control signal reads the addressed data word from the data RAM 92 and sends that data word to the output buffer 93 as indicated by reference numeral 56b. Then the output buffer 93 then sends the data word to the processor bus as indicated by reference numeral 56c.

Figure 15:
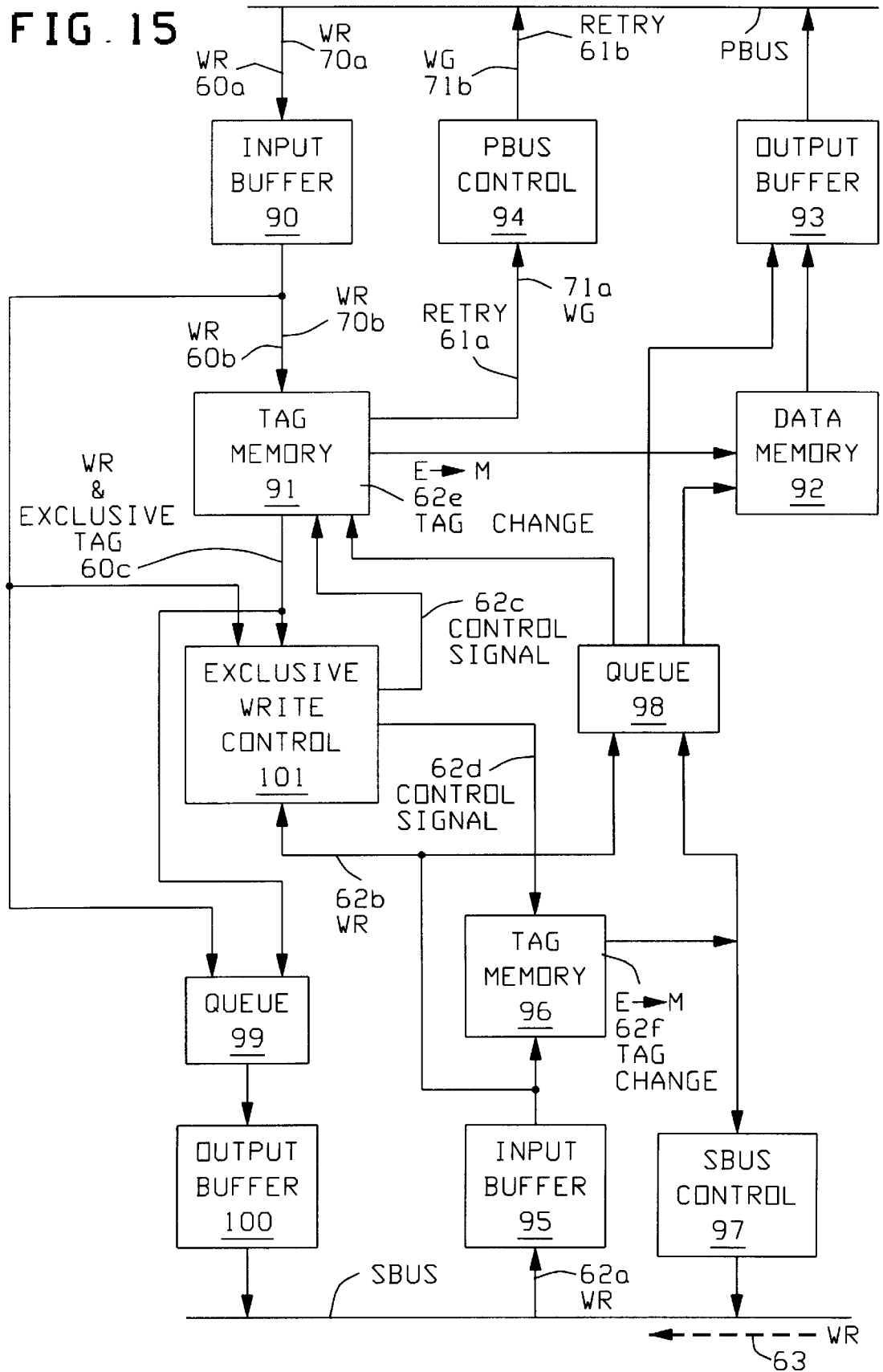
FIG. 15 shows how all of the modules in the high level cache memory of FIG. 9 interact during the signal sequences 60, 61, 62, 70 and 71 in FIGS. 8A and 8B.

In FIG. 15, reference numerals 60a–60b and 61a–61b respectively indicate how the WRITE REQUEST signal and RETRY signal occur in the high-level cache memory for cluster 18a during the WRITE operation of FIG. 8a. Initially, as is indicated by reference numeral 60a, the WRITE REQUEST signal is loaded from the processor bus into the input buffer 90. Then, as indicated by reference numeral 60b, the WRITE REQUEST signal is sent to the tag-memory 91 wherein a MATCH signal is generated. This MATCH signal indicates that the WRITE REQUEST is for a data word which has an address that equals a compare address in the tag-memory 91. In response to that MATCH signal and the exclusive state of the tag bits for the matching compare address, the tag-memory 91 directs the control circuit 94 to send a RETRY signal on the processor bus as indicated by reference numeral 61a and 61b.

Concurrent with the above operation, the snoop operation 62 is performed in FIG. 15 wherein any WRITE REQUEST which may be present on the system bus (such as the WRITE REQUEST 63) is loaded into the input buffer 95; and this is indicated by reference numeral 62a. If a WRITE REQUEST is present, it is then transferred from the input buffer 95 to the WRITE control circuit 101 as indicated by reference numeral 62b. Then, the WRITE control circuit 101 compares the WRITE request from the system bus with the WRITE REQUEST signal which occurred on the processor bus as indicated by reference numeral 60c. If the WRITE control circuit 101 determines that no WRITE REQUEST is present on the system bus with the same write address as the WRITE REQUEST which occurred on the processor bus, then the WRITE control circuit 101 sends a control signal 62c to the tag-memory 91 and a control signal 62d to the tag-memory 96. In response, the tag-memory 91 changes from exclusive to modified, the tag bits of the data word which is to be written by the WRITE request 60a; and this is indicated by reference numeral 62e. Also, the tag-memory 96 changes its internally stored tag bits in the same fashion as indicated by reference numeral 62f.

Thereafter in FIG. 15, another WRITE REQUEST signal is received in the input buffer 90 as indicated by reference numeral 70a. This WRITE REQUEST signal occurs on the processor bus in response to the previously sent RETRY signal 61b. From the input buffer 90, the WRITE REQUEST signal is sent to the tag-memory 91 wherein a MATCH signal is generated which indicates that the WRITE REQUEST is for a data word which has an address that equals a compare address in the tag-memory 91. In response to that MATCH signal and the modified state of the tag bits for the matching compare address, the tag-memory 91 directs the control circuit 94 to send a WRITE grant signal on the processor bus; and this is indicated by reference numerals 71a and 71b.

Figure 16:
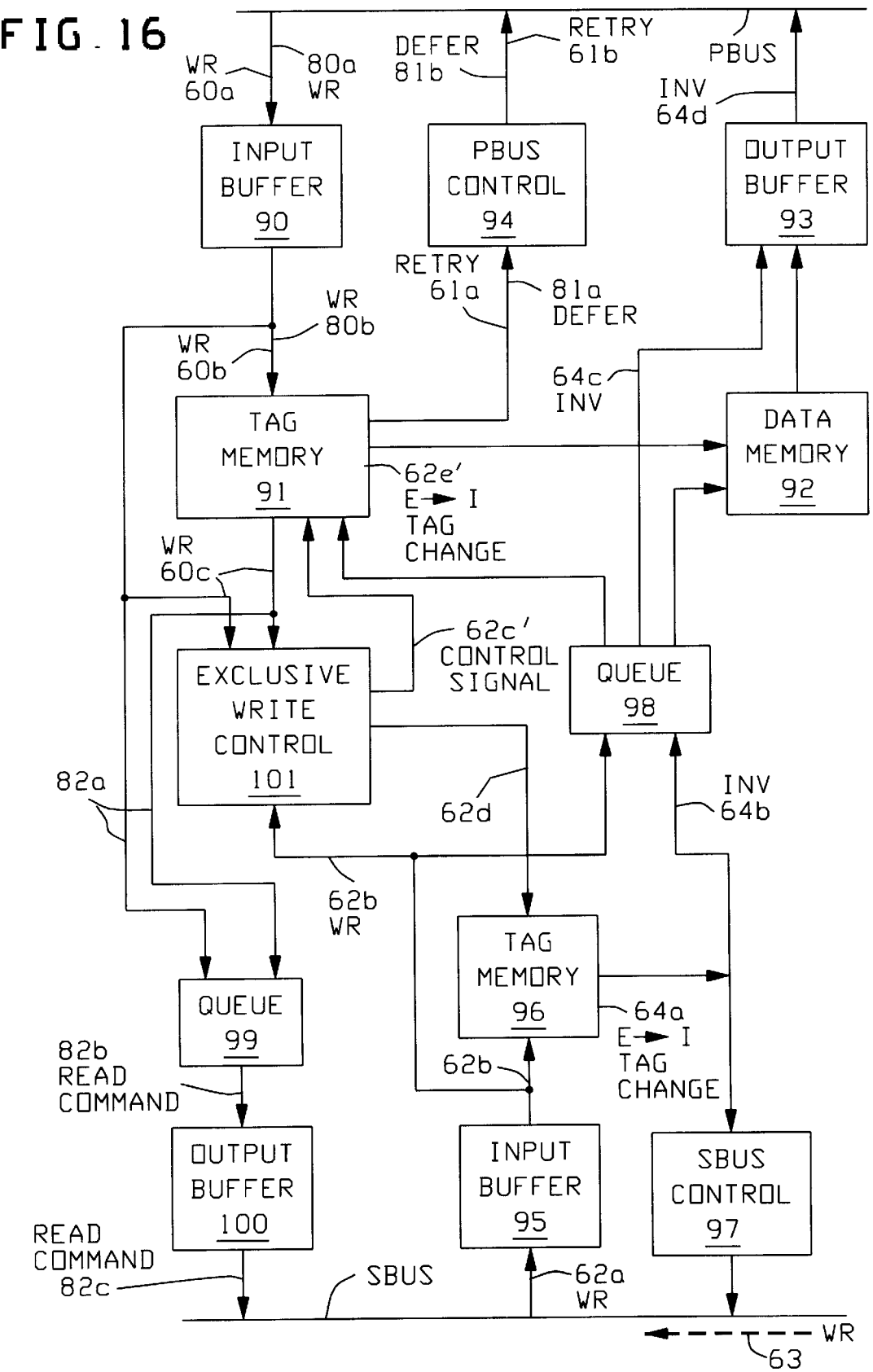
FIG. 16 shows how all of the modules in the high level cache memory of FIG. 9 interact during the signal sequences 60, 61, 62, and 64 in FIGS. 8A, 8B', and 8C'.

In FIG. 16, reference numerals 60a–60b and 61a–61b again indicate how the WRITE REQUEST signal and RETRY signal occur in the high-level cache memory for cluster 18a during the write operation of FIG. 8A. This is a repeat of what is shown by the reference numeral 60a–60b and 61a–61b in FIG. 15. But, FIG. 16 also shows a snoop operation wherein a WRITE REQUEST is detected on the system bus with the same address as the WRITE REQUEST which occurs on the processor bus. This corresponds to the signal sequence which occurs in the high-level cache memory for cluster 18a as shown in FIGS. 8B' and 8C'.

Initially in the snoop operation of FIG. 16, the WRITE REQUEST signal on the system bus is loaded into the input buffer 95 as indicated by reference numeral 62a. That WRITE REQUEST signal is then transferred from the input buffer 95 to the WRITE control circuit 101 as indicated by reference numeral 62b. Then, the WRITE control circuit 101 compares the WRITE REQUEST from the system bus with the WRITE REQUEST signal which was received from the processor bus as indicated by reference numeral 60c. When the WRITE control circuit 101 determines that the WRITE REQUEST from the system bus has the same write address as the WRITE REQUEST from the processor bus, the WRITE control circuit 101 sends a control signal to the tag-memory 91 as indicated by reference numeral 62c'. In response to this control signal, the tag-memory 91 changes from exclusive to invalid, the tag bits of the data word which is to be written; and this is indicated by reference numeral 62e'.

Concurrent with the above operation, the WRITE REQUEST which occurred on the system bus is transferred from the input buffer 95 to the tag-memory 96 wherein a MATCH signal is generated. This MATCH signal indicates that the WRITE REQUEST on the system bus is for a data word which has a compare address that is in the tag-memory 96. In response to that MATCH signal, the tag bits for the matching compare address are changed in the tag-memory 96 from exclusive to invalid as indicated by reference numeral 64a. Then, the tag-memory 96 sends an invalidate command to the queue circuit 98 as indicated by reference numeral 64b; and that invalidate command is subsequently sent via the output buffer 93 to the processor bus as indicated by reference numerals 64c and 64d.

Thereafter, another WRITE REQUEST signal is received in the input buffer 90 as indicated by reference numeral 80a. This WRITE REQUEST occurs on the processor bus in response to the RETRY signal 61b which was previously sent by the control circuit 94. From the input buffer 90, the WRITE REQUEST signal is sent to the tag-memory 91 wherein a MATCH signal is generated which indicates that the WRITE REQUEST signal 80b is for a data word which has a compare address that is in the tag-memory 91. In response to that MATCH signal, the tag bits for the matching compare address, the tag RAM 91 directs the control circuit 94 to send a defer signal on the processor bus as indicated by reference numerals 81a and 81b. Also, in response to the MATCH signal and the invalid state of the tag bits for the matching compare address, the tag-memory 91 causes a READ command to be loaded into the queue circuit 99 as indicated by reference numeral 82a. That READ command is then transferred via the output buffer 100 to the system bus as indicated by reference numerals 82b and 82c.

Figure 17:
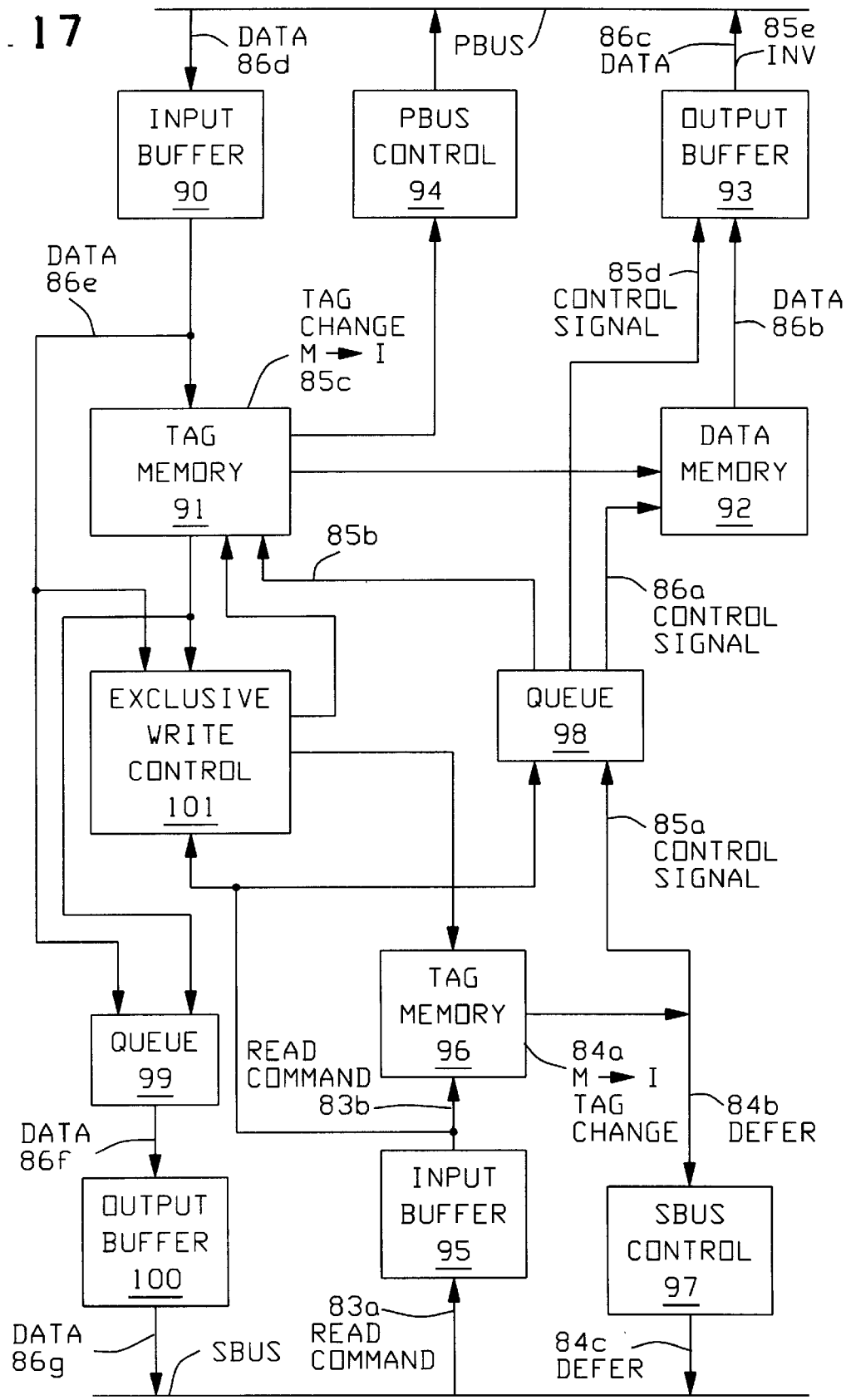
FIG. 17 shows how all of the modules in the high level cache memory of FIG. 9 interact during the signal sequences 83, 84, 85, and 86 in FIGS. 8B' and 8C'.

This READ command 82c travels on the system bus to the high-level cache memory for cluster 18e where it is acted upon as shown in FIG. 17. Initially, the READ command is received in the input buffer 95 as indicated by reference numeral 83a. Then the READ command is transferred to the tag-memory 96 wherein a MATCH signal is generated which indicates that the READ command is for a data word which has an address that matches a compare address in the tag-memory. In response to that MATCH signal and the modified state of the tag bits for the matching compare address, the tag-memory 96 changes the tag bits from modified to invalid as indicated by reference numeral 84a, and the tag-memory 96 directs the control circuit 97 to send a defer signal on the system bus as indicated by reference numerals 84b and 84c. Further, the tag-memory 96 sends a control signal to the queue circuit 98, as indicated by reference numeral 85a, which causes three actions to be taken. First, the tag bits for the address of the data word which is to be read are changed from modified to invalid in the tag RAM 91 as indicated by reference numerals 85b and 85c. Then, an invalidate command for the data word which is to be read is sent from the output buffer 93 to the processor bus as indicated by reference numerals 85d and 85e. Then, the data word which is to be read is transferred from the data RAM 92 to the output buffer 93 as indicated by reference numerals 86a and 86b. That data word is then transferred from the output buffer 93 to the system bus as indicated by reference numerals 86c, 86d, 86e, 86f, and 86g.

Turning now to FIG. 18, a preferred internal structure for module 101 within the high level cache memory will be described. Module 101 is used in many of the signal sequences which occur in FIGS. 15 and 16 wherein write requests are processed for data words which have exclusive tag bits. This FIG. 18 embodiment for module 101 includes a comparator circuit 110, an inverter gate 111, a pair of AND gates 112 and 113, and four synchronizer circuits 114–117; all of which are interconnected as shown. Each component 110–117, by itself, is described in the prior art. For example, each synchronizer circuit may be constructed as described in U.S. Pat. No. 4,839,541.

In operation, the WRITE REQUEST signal 60a is loaded from the processor bus into the input buffer 90. Then, the WRITE REQUEST signal is sent to the tag-memory 91, as indicated by reference numeral 60b, wherein a MATCH signal is generated. In response to that MATCH signal and the exclusive state of the tag bits for the matching compare address, the tag-memory 91 causes a RETRY signal to be sent on the processor bus as indicated by reference numeral 61b.

While the above operations occur, the WRITE REQUEST 60a is transferred from the input buffer 90 to the synchronizing circuit 114 and the exclusive tag bit for the matching compare address is transferred from the tag-memory 91 to the synchronizing circuit 115. This is indicated by reference numeral 60c. At the same time, any WRITE REQUEST which may be present on the system bus is loaded into the input buffer 95 as indicated by reference numeral 62a. Then, the comparator 110 compares the WRITE REQUEST which is in the synchronizing circuit 114, to the content of the input buffer 95. If the synchronizing circuit 114 and the input buffer 95 both contain a WRITE REQUEST for the same data word, then the comparator circuit 110 generates an EQUAL signal on its output.

If the EQUAL signal does not occur, then AND gate 112 sends a control signal to the synchronizing circuit 117 which directs the tag-memory 91 to change the tag bits for the matching compare address from exclusive to modified; and this is indicated by reference numeral 62c. Also, that same control signal is also sent to the tag-memory 96; and in response, the tag-memory 96 changes its tag bits for the matching compare address in the same fashion. This is indicated by reference numeral 62d. Conversely, if the EQUAL signal does occur, then AND gate 113 sends a control signal to the synchronizing circuit 116 which directs the tag-memory 91 to change the tag bits for the matching compare address from exclusive to invalid; and this is indicated by reference numeral 62c'.

Thereafter, in response to the RETRY signal 61b, a second WRITE request is received in the input buffer 90 as indicated by reference numeral 70a. This second WRITE request is then transferred to the tag-memory 91 as indicated by reference numeral 70b; and in response, a MATCH signal is generated. If the tag bits for the matching compare address have been changed to the modified state by the control signal 62c, then a WRITE GRANT signal is sent on the processor bus as indicated by reference numeral 71b. Otherwise, if the tag bits for the matching compare address have been changed to the invalid state by the control signal 62c', the DEFER signal is sent on the processor bus as indicated by reference numeral 81b.

With the above-described embodiment for module 101, all of the signals which occur on the processor bus may be synchronized to one clock CK1, and all of the signals which occur on the system bus may be synchronized to another clock CK2 which is asynchronous to the clock CK1. These two asynchronous clocks will not cause any malfunction in module 101 because all of the signals which pass through the comparator 110 and the logic gates 111–113 are synchronized to just a single clock (which is the system bus clock CK2). Similarly, these two asynchronous clocks will not cause the tag-memory 91 to malfunction because all of the signals which it receives are synchronized to just a single clock (which is the processor clock CK1).

Figure 19:
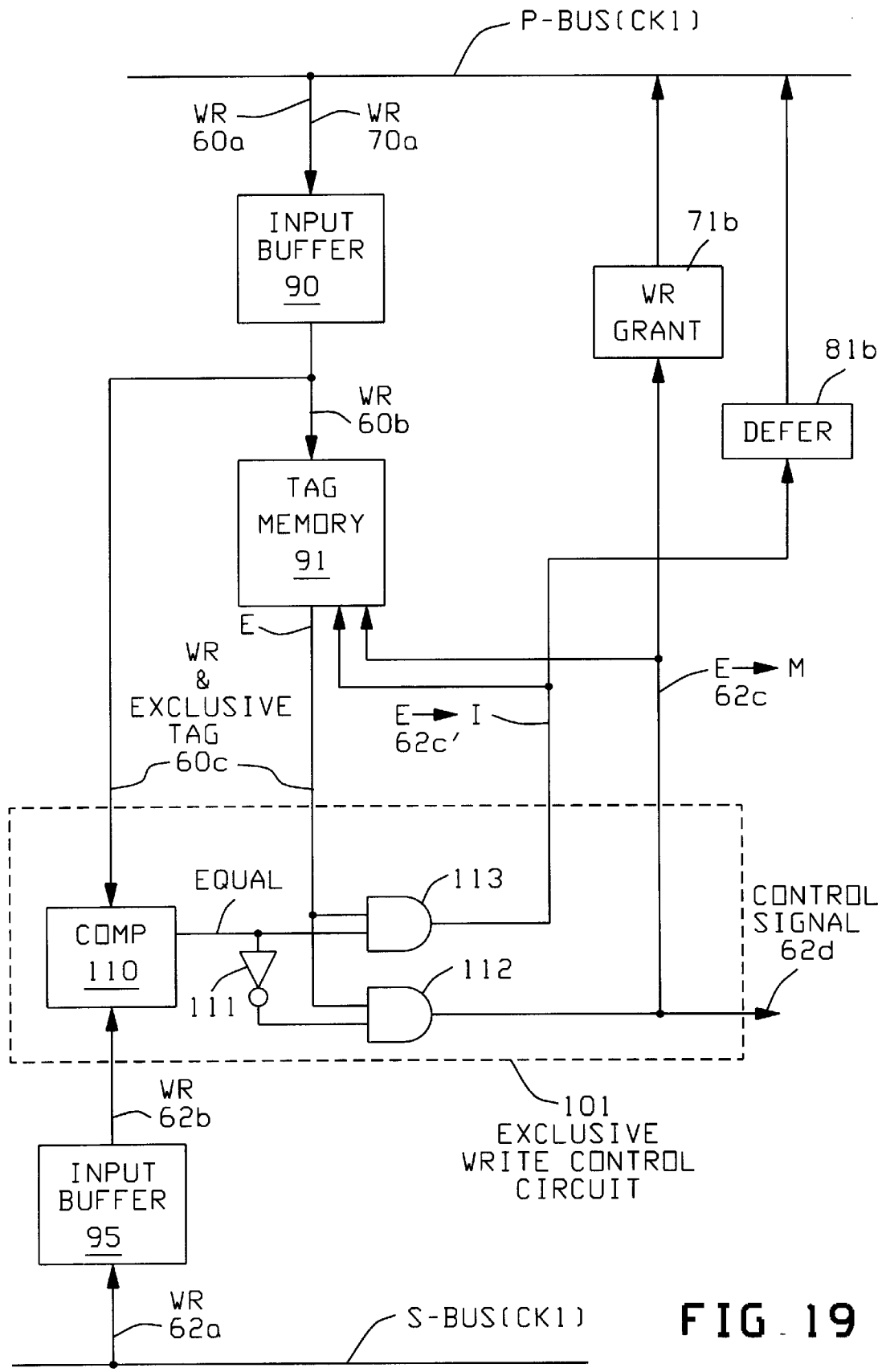
FIG. 19 shows an alternate preferred internal structure for module 101 which is included in the high level cache memory of FIG. 9.

Next, as an alternative, suppose that all of the signals which occur on the processor bus and all of the signals which occur on the system bus are synchronized to the same clock CK1. In that case, the FIG. 18 internal structure for module 101 may be modified as shown in FIG. 19. With this modification, no RETRY signal is sent to the processor bus and no second WRITE REQUEST is received from the processor bus. Instead, in response to the first WRITE request 60a, either the WRITE GRANT signal 71b or the DEFER signal 81b is sent to the processor bus.

Initially, in FIG. 19, the WRITE REQUEST signal 60a is loaded from the processor bus into the input buffer 90; and from there, the WRITE REQUEST signal is sent to the tag-memory 91. Then, a match signal is generated if the tag-memory 91 contains a compare address which equals the address of the data word that is to be written. In response to that match signal, the tag for the matching compare address is sent directly to the AND gates 112 and 113. At the same time, any WRITE REQUEST which may be present on the system bus is loaded into the input buffer 95. Then, the comparator 110 compares the content of the input buffer 95 to the WRITE REQUEST which is in the input buffer 90; and, an EQUAL signal is generated if the input buffers 90 and 95 both contain a WRITE REQUEST for the same data word.

If the EQUAL signal does not occur while the AND gate 112 is receiving an exclusive tag-bit from the tag-memory 91, then the AND gate 112 causes that tag bit to be changed from exclusive to modified in a tag-memory 91, and causes the WRITE GRANT signal to be sent on the processor bus. This is indicated by reference numerals 62c and 71b. Conversely, if the EQUAL signal does occur while the AND gate 113 is receiving the exclusive tag bit from the tag-memory 91, then the AND gate 113 causes that exclusive tag bit to be change to invalid, and causes the DEFER signal to be sent on the processor bus. This is indicated by reference numerals 62c' and 81b.

Various signal sequences have been described above as occurring separate from each other, as shown in FIGS. 3–8C' and 10–17. But in addition, many combinations of those same signal sequences can occur at the same time.

For example, the signal sequence of FIG. 4 can occur simultaneously with the signal sequence of FIG. 7. In that case, the digital computer P20 reads a data word from the main memory on the system bus (FIG. 4) while the digital computer P1 reads the same data word from its high-level cache memory (FIG. 7). To accomplish the above, the high level cache memory which is coupled to the digital computer P1, sends a SHARED control signal on the system bus by performing the signal sequence 36a–36h which is detailed in FIG. 11; and it simultaneously sends a data word on the processor bus by performing the signal sequence 55a–56c which is detailed in FIG. 14. This simultaneous operation is possible because the tag memories 91 and 96 operate in parallel with each other.

As another example, the high level cache memory which is performing the snoop operation 83 in FIG. 8C' can simultaneously be transferring a data word to one of its digital computers P17–P20 by performing the signal sequences 55 and 56 of FIG. 7. During the snoop operation, the high level cache memory sends a DEFER signal onto the system bus as illustrated by the signal sequence 83a–84c in FIG. 17; and during the READ operation, the data word is simultaneously sent on the processor bus as illustrated by the signal sequence 55a–56c of FIG. 14. Here again, this simultaneous operation is possible because the tag memories 91 and 96 operate in parallel with each other.

Based on the above detailed description of FIGS. 1 through 19, it will be apparent to one of ordinary skill in the art that many modifications can be made to the preferred methods and circuits, which are illustrated, without departing from the nature and spirit of the present invention. Accordingly, it is to be understood that the present invention is not limited to just the illustrated preferred embodiments but is defined by the appended claims.

What is claimed is:

1. A method of modifying data words in a particular type of distributed data processing system which contains—a system bus having a main memory coupled thereto; multiple high level cache memories, each of which has a first port coupled to said system bus and a second port coupled to a respective processor bus; each processor bus being coupled through respective low level cache memories to respective digital computers; wherein said method includes the steps of:

storing a data word in one high level cache memory with tag bits which identify said data word as shared if said data word is also in another high level cache memory, and as exclusive if said data word is in no other high level cache memory; and storing the same data word in a low level cache memory coupled to said one high level cache memory as shared;

receiving a request to write said data word, from the processor bus which is coupled to said second port of said one high level cache memory;

snooping on said system bus from said first port of said one high level cache memory in response to said request to write; and, sending a WRITE GRANT signal from the second port of said one high level cache memory to the processor bus which is coupled thereto, without sending any signals from said first port to said system bus, if said tag bits in said one high level cache memory identify said data word as exclusive and a Write Request for said data word from another high level cache memory is not detected on said system bus by said snooping step.

2. A method according to claim 1 wherein said system bus and each processor bus are synchronized to respective clocks which are asynchronous to each other.

3. A method according to claim 2 wherein between receiving said WRITE REQUEST signal and sending said WRITE GRANT signal, said one high level cache memory sends a RETRY signal from its second port to said processor bus which is coupled thereto and receives another WRITE REQUEST signal therefrom.

4. A method according to claim 1 wherein said system bus and each processor bus are synchronized to the same clock.

5. A method according to claim 4 wherein said one high level cache memory sends said WRITE GRANT signal from its second port to said processor bus which is coupled thereto without sending any RETRY signal to that processor bus.

6. A method according to claim 1 wherein said one high level cache memory changes said tag bits for said data word from exclusive to modified if said WRITE GRANT signal is sent from said second port of said one high level cache memory.

7. A method according to claim 1 wherein said one high level cache memory snoops on said system bus and changes said tag bits for said data word from exclusive to shared if said data word is read from said main memory by another high level cache memory.

8. A method according to claim 1 wherein said one high level cache memory snoops on said system bus and changes said tag bits for said data word from exclusive to invalid if a WRITE REQUEST for said data word occurs on said system bus from another high level cache memory.

* * * * *